US012591654B2

(12) United States Patent
Mao et al.

(10) Patent No.: US 12,591,654 B2
(45) Date of Patent: Mar. 31, 2026

(54) FLEXIBLE AUTHORIZATION ACCESS CONTROL METHOD, RELATED APPARATUS, AND SYSTEM

(71) Applicant: HUAWEI TECHNOLOGIES CO., LTD., Shenzhen (CN)

(72) Inventors: Zhewen Mao, Beijing (CN); Bingfei Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 18/041,795

(22) PCT Filed: Mar. 3, 2022

(86) PCT No.: PCT/CN2022/078940
§ 371 (c)(1),
(2) Date: Feb. 15, 2023

(87) PCT Pub. No.: WO2022/188683
PCT Pub. Date: Sep. 15, 2022

(65) Prior Publication Data
US 2024/0012899 A1 Jan. 11, 2024

(30) Foreign Application Priority Data

Mar. 12, 2021 (CN) .......................... 202110268814.3

(51) Int. Cl.
*G06F 21/00* (2013.01)
*G06F 21/31* (2013.01)
*G06F 21/44* (2013.01)

(52) U.S. Cl.
CPC .............. *G06F 21/44* (2013.01); *G06F 21/31* (2013.01)

(58) Field of Classification Search
CPC ................................. G06F 21/31; G06F 21/44
See application file for complete search history.

(56) References Cited

U.S. PATENT DOCUMENTS

| | | | |
|---|---|---|---|
| 8,769,610 | B1 | 7/2014 | Giguiere et al. |
| 2012/0304257 | A1* | 11/2012 | Kalofonos ............ H04L 63/102 726/4 |

(Continued)

FOREIGN PATENT DOCUMENTS

| | | |
|---|---|---|
| CN | 103853986 A | 6/2014 |
| CN | 107612939 A | 1/2018 |

(Continued)

*Primary Examiner* — Rodman Alexander Mahmoudi

(57) ABSTRACT

This disclosure provides a flexible authorization access control method, a related apparatus, and a system. In the method, if an electronic device that receives an access request does not meet an authorization condition, is currently not suitable for authorization, or cannot currently obtain authorization from a user in time, the electronic device may select one electronic device in a distributed system as an authorization device. After obtaining a permission that is granted by the user and that is required for the access request, the authorization device notifies the electronic device, and then the electronic device may respond to the access request. In this disclosure, the electronic device can quickly and conveniently obtain the permission required for the access request and respond to the access request in a case in which the user is not disturbed, to ensure data security in the electronic device and meet a requirement of the user.

17 Claims, 15 Drawing Sheets

(56) References Cited

U.S. PATENT DOCUMENTS

| | | | |
|---|---|---|---|
| 2015/0244876 A1* | 8/2015 | Jabara ............... | H04M 15/8044 |
| | | | 455/406 |
| 2016/0132687 A1 | 5/2016 | Nallagonda et al. | |
| 2016/0173466 A1 | 6/2016 | Stevens et al. | |
| 2017/0208137 A1 | 7/2017 | Kirkpatrick et al. | |
| 2018/0302790 A1* | 10/2018 | Cotterill ............... | H04L 63/083 |
| 2019/0097814 A1 | 3/2019 | Phillips, III et al. | |
| 2019/0362378 A1* | 11/2019 | McDonnell ........ | G06Q 30/0246 |
| 2020/0028848 A1 | 1/2020 | Gupta et al. | |
| 2021/0014683 A1 | 1/2021 | Obaidi | |
| 2021/0019410 A1* | 1/2021 | Huang ................... | G06F 21/82 |
| 2021/0329015 A1* | 10/2021 | Devane ................ | H04L 63/145 |
| 2024/0176872 A1 | 5/2024 | Ren et al. | |
| 2024/0214350 A1* | 6/2024 | Sole ................... | H04L 63/0807 |

FOREIGN PATENT DOCUMENTS

| | | | |
|---|---|---|---|
| CN | 107784221 A | 3/2018 | |
| CN | 107944257 A | 4/2018 | |
| CN | 109412972 A | 3/2019 | |
| CN | 110287720 A | 9/2019 | |
| CN | 111638966 A | 9/2020 | |
| CN | 112231077 A | 1/2021 | |
| CN | 112398855 A | 2/2021 | |
| CN | 114996667 A | 9/2022 | |

* cited by examiner

Object device

Distributed application permission management module

Local application permission management module

Access control module

Distributed permission information base

Local permission information base

Authorization decision-making module

Device attribute management module

Device information base

Authorization module

User interface 51      501

User interface 52      501

User interface 62

The instant messaging application in the mobile phone requests to invoke the camera in the smart screen. Do you agree to invoke the camera?

The instant messaging application in the mobile phone requests to invoke the camera in the smart screen. Do you agree to invoke the camera?

User interface 81

FLEXIBLE AUTHORIZATION ACCESS CONTROL METHOD, RELATED APPARATUS, AND SYSTEM

CROSS-REFERENCE TO RELATED APPLICATIONS

This is a National Stage of International Patent Application No. PCT/CN2022/078940 filed on Mar. 3, 2022, which claims priority to Chinese Patent Application No. 202110268814.3 filed on Mar. 12, 2021. Both of the aforementioned applications are hereby incorporated by reference in their entireties.

TECHNICAL FIELD

This disclosure relates to the field of computer and communications technologies, and in particular, to a flexible authorization access control method, a related apparatus, and a system.

BACKGROUND

With development of intelligent terminals, there are more types and quantities of devices in a user's life, and a distributed scenario in which devices are interconnected is gradually implemented. In the distributed scenario, devices share resources with each other, for example, share computing capabilities, storage resources, and network resources, which will become a future trend.

To protect user privacy, a related technology requires that an application in an electronic device needs to explicitly obtain authorization from the user when accessing sensitive information of the user. In the distributed scenario, when a device is to access a resource in another device, the user needs to give authorization on the accessed device.

However, when the accessed device does not meet an authorization condition or is not next to the user, the user cannot authorize the device in time, which affects resource sharing between the devices. In addition, if the accessed device is executing a first task, the task may be interrupted because of user authorization, which affects user experience.

SUMMARY

This disclosure provides a flexible authorization access control method, a related apparatus, and a system, so that an electronic device can quickly and conveniently obtain a permission required for an access request and respond to the access request in a case in which the user is not disturbed and user experience is ensured.

According to a first aspect, an embodiment of this disclosure provides a flexible authorization access control method. The method is applied to a communications system including a plurality of electronic devices, the plurality of electronic devices include a first device, and an invokee is installed in the first device. The invokee is an application APP or a functional component, where the APP is a program entity that implements a plurality of functions, and the functional component is a program entity that implements a single function.

The method in the first aspect includes: the first device obtains an access request, where the access request is used to invoke the invokee in the first device to access a first resource in the first device; the first device determines a second device in the plurality of electronic devices in one or more of the following cases: the first device is not configured with a first module configured to receive a first operation, the first device is configured with the first module and executes a first task by using the first module, the first device is in a screen-locked state, or a distance between the first device and a user is greater than a first value; the first device sends an authorization request to the second device, where the authorization request is used to request the user to grant a first permission, and the first permission includes a permission to invoke the invokee in the first device, and/or a permission to access the first resource in the first device; the second device outputs prompt information in response to the authorization request, where the prompt information is used to prompt the first permission; the second device receives the first operation, and sends an authorization result to the first device in response to the first operation, where the authorization result indicates that the user has granted the first permission; and the first device invokes the invokee in response to the authorization result to access the first resource.

In the method in the first aspect:

The first module includes hardware and/or software that are/is actually provided in the electronic device. The electronic device may provide an authorization manner by using the first module to obtain user authorization. For example, the first module may include but is not limited to one or more of the following: a display, a fingerprint sensor, a camera, a facial recognition algorithm, a sound pickup device, or a button. One electronic device may have a plurality of first modules. Different electronic devices may have a same module or different first modules.

When the first device is not configured with the first module that is configured to receive the first operation, it signifies that the first device does not meet an authorization condition.

When the electronic device provides an authorization manner for user authorization, a task that may be interrupted or suspended in the electronic device may be referred to as a first task. In one aspect, the first task is related to an authorization manner supported by the electronic device. A resource used when the electronic device executes the first task is the same as a resource required for the authorization manner supported by the electronic device. In another aspect, the first task may be related to user experience. Because user experience is affected after the first task is interrupted or suspended, the user does not want the first task to be interrupted or suspended. Different electronic devices may correspond to a same first task, or may correspond to different first tasks. This is not limited herein.

For example, the first task may include one or more of the following: running a game application in full screen, or watching a video in full screen.

When the first device is configured with the first module and executes the first task by using the first module, it signifies that the user is disturbed and user experience is affected if the first device provides an authorization manner.

When the first device is in the screen-locked state, the electronic device can provide an authorization manner for user authorization only after the user performs an unlock operation on the electronic device, which requires complex operations.

When the distance between the first device and the user is greater than the first value, the electronic device cannot obtain authorization from the user within a preset time.

Therefore, according to the method provided in the first aspect, the first device can quickly and conveniently obtain a permission required for the access request and respond to the access request in a case in which the user is not disturbed and user experience is ensured, to meet an actual requirement of the user.

With reference to the first aspect, in some implementations, the plurality of electronic devices in the communications system further include a third device. An invoker is installed in the third device, and the invoker is the APP or the functional component. The access request obtained by the first device may be the access request sent by the third device to the first device, and the access request is specifically used by the invoker in the third device to invoke the invokee in the first device and access the first resource.

In the foregoing implementation, if the electronic device receives an access request sent by another electronic device, the electronic device that receives the access request can obtain a permission required for the access request in a case in which the user is not disturbed and user experience is ensured. This ensures that electronic devices in a distributed system can access a resource in another electronic device across devices, so that the electronic devices can share resources with each other, to meet an actual requirement of the user.

With reference to the foregoing implementation, the first permission may include one or more of the following:

1. A permission for the third device to invoke the invokee in the first device, and/or a permission for the third device to access the first resource in the first device.
2. A permission for the invoker to invoke the invokee in the first device, and/or a permission for the invoker to access the first resource in the first device.

When the first permission relates to the third device and/or the invoker, the user may learn more detailed information about the permission required for the access request obtained by the first device, to determine whether to grant the permission to the first device. This can ensure that the user fully understands the permission required for the access request, and then performs an authorization operation, to avoid a misoperation or false authorization of the user, and ensure data security in the first device.

With reference to the foregoing implementation, before the third device sends the access request to the first device, the first device may send first capability information to the third device, where the first capability information indicates that the first device opens a second permission to the third device. The second permission includes a permission to invoke the invokee in the first device and/or to access the first resource.

After the first device sends the first capability information to the third device, the third device may grant the second permission to the invoker. In this way, the invoker in the third device has the permission to invoke the invokee in the first device and/or to access the first resource, and may send the access request to the first device.

With reference to the first aspect, in some implementations, an invoker is further installed in the first device, and the invoker is the APP or the functional component. The first device may generate the access request, and the access request is specifically used by the invoker in the first device to invoke the invokee and access the first resource.

With reference to any one of the first aspect or the foregoing implementations, in some implementations, the first device may establish a communication connection to the second device, and the like by logging in to a same account, binding a device, scanning QR code, or the like. A type of the communication connection established between the first device and the second device is not limited herein. For example, the communication connection may include a wired connection, a wireless connection such as a Bluetooth connection, a Wi-Fi P2P connection, an NFC connection, an IR connection, a remote connection, and the like.

With reference to any one of the first aspect or the foregoing implementations, in some implementations, the first device may select the second device by using the following policies:

1. If the first device is a thin device, the first device selects a control device of the thin device as an authorization device, selects a rich device in the distributed system as an authorization device, or selects an electronic device that keeps a communication connection to the first device for more than a preset duration as an authorization device.
2. In electronic devices other than the first device in the communications system, the first device selects an authorization device based on one or more of the following of the electronic devices: whether the first module is configured, a quantity of the configured first modules, a screen status, a running status, or distances between the electronic devices and the user.

For example, the first device may select an electronic device configured with the first module as the second device. For another example, the first device may select an electronic device that meets one or more of the following as the second device: a screen status is an unlocked state, a running status indicates that the first task is not executed, or a distance between the electronic device and the user is less than a second value.

With reference to any one of the first aspect and the foregoing implementations, in some implementations, the first operation includes one or more of the following: a user operation performed on a display, a preset face image, a preset fingerprint, a preset voice instruction, or a user operation performed on a button.

With reference to any one of the first aspect and the foregoing implementations, in some implementations, the second device may display a first user interface in response to the authorization request, where prompt information and a first control are displayed in the first user interface; and the first operation includes a user operation performed on the first control. That is, the second device may obtain the first permission granted by the user in a pop-up authorization manner.

With reference to any one of the first aspect and the foregoing implementations, in some implementations, after that the first device obtains an access request, the first device may further determine a second module, and send indication information of the second module to the second device. The second device receives the first operation by using the second module.

In a specific example, the first device may prioritize various authorization manners in advance, for example, priorities of pop-up authorization, facial verification authorization, fingerprint verification authorization, voice instruction authorization, and button authorization decrease in descending order, and may determine a first module corresponding to an authorization manner that has highest priority and that is provided by the second device as the second module.

With reference to any one of the first aspect and the foregoing implementations, in some implementations, the first resource may be a sensitive resource. The sensitive resource may be a resource that causes relatively high risks to user privacy after being leaked, for example, a resource whose privacy degree is higher than a threshold. The sensitive resource may include hardware resources, software resources, and stored data in the electronic device. This can ensure that user authorization may be explicitly obtained when the sensitive resource in the first device is accessed, to ensure data security of the user.

According to a second aspect, this disclosure provides a flexible authorization access control method. The method is applied to a first device, and an invokee is installed in the first device. The invokee is an application APP or a functional component, where the APP is a program entity that implements a plurality of functions, and the functional component is a program entity that implements a single function. The method includes: the first device obtains an access request, where the access request is used to invoke the invokee in the first device to access a first resource in the first device; the first device determines a second device in a plurality of electronic devices in one or more of the following cases: the first device is not configured with a first module configured to receive a first operation, the first device is configured with the first module and executes a first task by using the first module, the first device is in a screen-locked state, or a distance between the first device and a user is greater than a first value; the first device sends an authorization request to the second device, where the authorization request is used to request the user to grant a first permission, and the first permission includes a permission to invoke the invokee in the first device, and/or a permission to access the first resource in the first device; the first device receives an authorization result sent by an authorization device, where the authorization result indicates that the user has granted the first permission; and the first device invokes the invokee in response to the authorization result to access the first resource.

In the method provided in the second aspect, for specific implementation of operations performed by the first device, refer to related descriptions of the first device side in any one of the implementations of the first aspect or the first aspect. Details are not described herein again.

According to a third aspect, this disclosure provides a flexible authorization access control method, applied to a second device. The method includes: the second device receives an authorization request sent by a first device, where the authorization request is used to request a user to grant a first permission, and the first permission includes a permission to invoke an invokee in the first device, and/or a permission to access a first resource in the first device; the invokee is installed in the first device, the invokee is an application APP or a functional component, the APP is a program entity that implements a plurality of functions, and the functional component is a program entity that implements a single function; the second device outputs prompt information in response to the authorization request, where the prompt information is used to prompt the first permission; and the second device receives a first operation, and sends an authorization result to the first device in response to the first operation, where the authorization result indicates that the user has granted the first permission.

In the method provided in the third aspect, for specific implementations of operations performed by the second device, refer to related descriptions of the second device side in any one of the implementations of the first aspect or the second aspect. Details are not described herein again.

According to a fourth aspect, an embodiment of this disclosure provides an electronic device. The electronic device includes: a memory, and one or more processors. The memory is coupled to the one or more processors, the memory is configured to store computer program code, the computer program code includes computer instructions, and the one or more processors invoke the computer instructions to enable the electronic device to perform the method according to any one of the second aspect or the implementations of the second aspect.

According to a fifth aspect, an embodiment of this disclosure provides an electronic device. The electronic device includes: a memory, and one or more processors. The memory is coupled to the one or more processors, the memory is configured to store computer program code, the computer program code includes computer instructions, and the one or more processors invoke the computer instructions to enable the electronic device to perform the method according to any one of the third aspect or the implementations of the third aspect.

According to a sixth aspect, an embodiment of this disclosure provides a communications system. The communications system includes a first device and a second device, where the first device is configured to perform the method according to any one of the second aspect or the implementations of the second aspect, and the second device is configured to perform the method according to any one of the third aspect or the implementations of the third aspect.

According to a seventh aspect, an embodiment of this disclosure provides a computer-readable storage medium. The computer-readable storage medium includes instructions, and when the instructions are run on an electronic device, the electronic device is enabled to perform the method according to any one of the second aspect or the implementations of the second aspect, or the method according to any one of the third aspect or the implementations of the third aspect.

According to an eighth aspect, an embodiment of this disclosure provides a computer program product. When the computer program product is run on a computer, the computer is enabled to perform the method according to any one of the second aspect or the implementations of the second aspect, or the method according to any one of the third aspect or the implementations of the third aspect.

According to the technical solutions provided in this disclosure, if an electronic device that receives an access request does not meet an authorization condition, is currently not suitable for authorization, or the electronic device cannot currently obtain authorization from the user in time, the electronic device may select one electronic device in a distributed system as an authorization device. After requesting the user to grant a permission required for the access request, the authorization device may send an authorization result in which authorization succeeds to the electronic device, and then the electronic device may respond to the access request. According to the technical solutions provided in this disclosure, the electronic device can quickly and conveniently obtain the permission required for the access request and respond to the access request in a case in which the user is not disturbed and user experience is ensured, to ensure data security in the electronic device and meet a user requirement.

DESCRIPTION OF EMBODIMENTS

Figure 1:
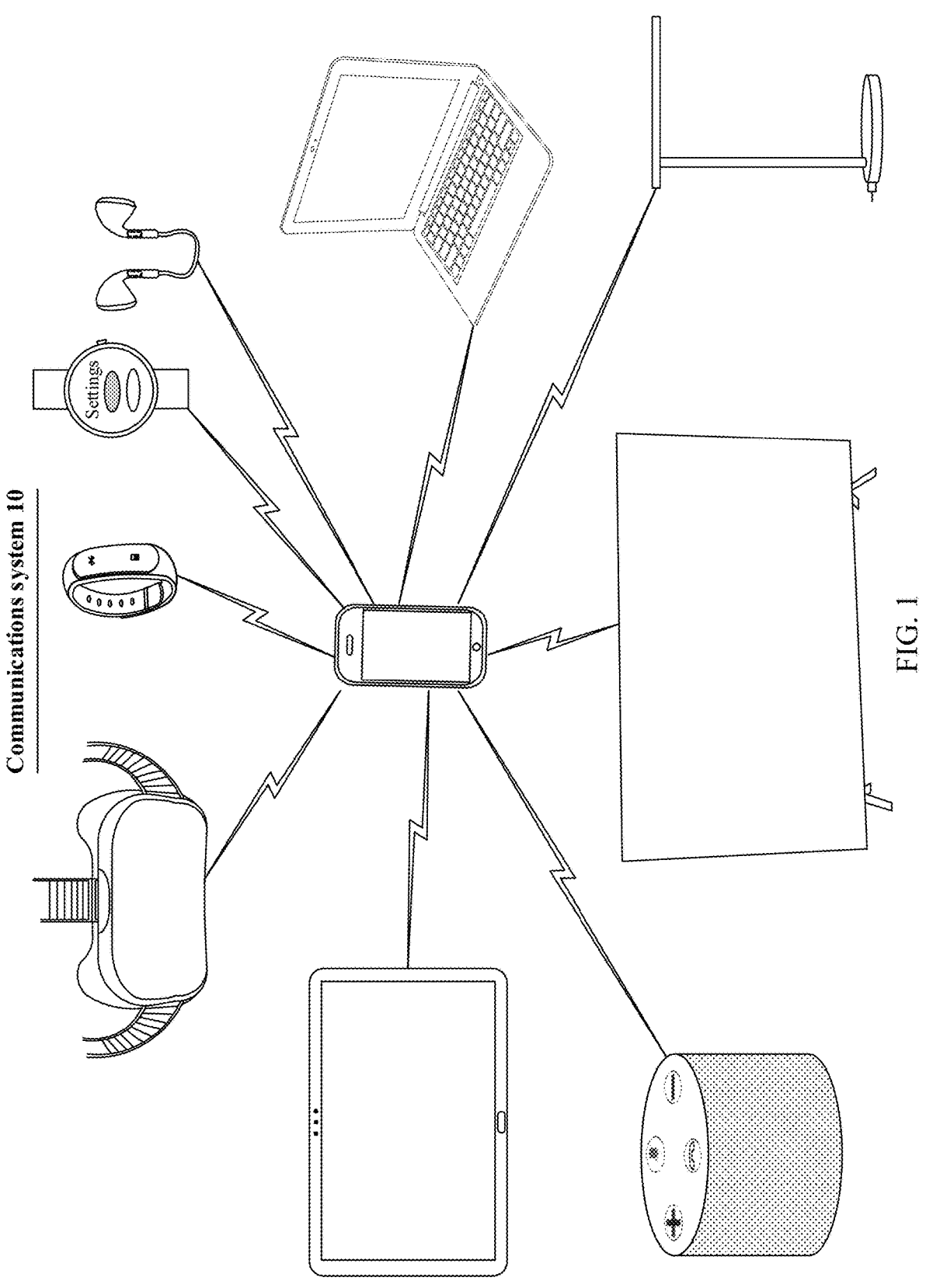
FIG. 1 is a schematic diagram of a structure of a communications system 10 according to an embodiment of this disclosure.

The technical solutions according to embodiments of this disclosure are clearly described in the following with reference to the accompanying drawings. In descriptions of embodiments of this disclosure, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this disclosure, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more.

A term "user interface (user interface, UI)" in the following embodiments of this disclosure is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphical user interface, GUI), and is a user interface that is related to a computer operation and that is displayed in a graphical manner. The user interface may be a visual interface element such as a text, an icon, a button, a menu, a tab, a text box, a dialog box, a status bar, a navigation bar, or a widget that is displayed on a display of the electronic device.

The following embodiments of this disclosure provide a flexible authorization access control method, a related apparatus, and a system. The method may be applied to a distributed system including a plurality of electronic devices.

In the method, after an electronic device obtains an access request used to access a first resource, if the electronic device does not meet an authorization condition, the electronic device is currently executing a first task, or the electronic device cannot obtain authorization from a user in time, the electronic device may select one electronic device in the distributed system as an authorization device. After requesting the user to grant a permission required for the access request, the authorization device may send an authorization result to the electronic device. If the authorization result indicates that the user agrees to grant the permission required for the access request, the electronic device obtains the permission required for the access request, and may access the first resource in response to the access request.

The access request obtained by the electronic device may be sent by another electronic device in the distributed system to the electronic device, or may be generated by the electronic device. This is not limited herein.

According to the access control method provided in embodiments of this disclosure, if the electronic device receives an access request sent by another electronic device, the electronic device that receives the access request can quickly and conveniently obtain a permission required for the access request in a case in which the user is not disturbed and user experience is ensured. This ensures that an electronic device in the distributed system can access a resource in another electronic device across devices, so that the electronic devices can share resources with each other, to meet an actual requirement of the user.

According to the access control method provided in embodiments of this disclosure, if the electronic device generates the access request, the electronic device can obtain the permission required for the access request when ensuring user experience. This ensures that the electronic device can access a resource in the electronic device, to meet an actual requirement of the user.

In some embodiments of this disclosure, the first resource may be a sensitive resource. The sensitive resource may be a resource that causes relatively high risks to user privacy after being leaked, for example, a resource whose privacy degree is higher than a threshold. The sensitive resource may include hardware resources, software resources, and stored data in the electronic device. The hardware resources may include, for example, a camera, an audio device, and a display. The software resources may include, for example, a memory resource, a computing capability (for example, a beautification algorithm capability and an audio/video encoding and decoding capability), a network capability, a positioning function, and a highly confidential APP (for example, a bank APP). The stored data may include, for example, stored user information, a stored photo, a stored video, and a stored password used by the user to log in to an application.

Authorization means that the user grants an electronic device a permission to perform an operation.

When the electronic device supports one or more authorization manners for user authorization, the electronic device meets an authorization condition. The authorization manner may include but is not limited to: pop-up authorization, fingerprint verification authorization, facial verification authorization, voice instruction authorization, and button authorization. This is not limited herein. For specific descriptions of the authorization manner, refer to the following method embodiments.

Whether the electronic device meets an authorization condition and a type of supported authorization manner depend on hardware and/or software configuration of the electronic device. For example, to support pop-up authorization, the electronic device needs to be configured with a display. To support fingerprint verification authorization, the electronic device needs to be configured with a fingerprint sensor. To support facial verification authorization, the electronic device needs to be configured with a camera and a facial recognition algorithm. To support voice instruction authorization, the electronic device needs to be configured with a microphone or another sound pickup device. To support button authorization, the electronic device needs to be configured with a physical button.

In this embodiment of this disclosure, hardware and/or software required when the electronic device provides an authorization manner may be referred to as a first module. For example, the first module may include but is not limited to one or more of the following: a display, a fingerprint sensor, a camera, a facial recognition algorithm, a sound pickup device, or a button.

When the electronic device provides an authorization manner for user authorization, a task that may be interrupted or suspended in the electronic device may be referred to as a first task. In one aspect, the first task is related to an authorization manner supported by the electronic device. A resource used when the electronic device executes the first task is the same as a resource required for the authorization manner supported by the electronic device. The resource may be an exclusive resource that can be accessed by only one application at a time. Therefore, when the electronic device provides the authorization manner for user authorization, the electronic device interrupts or suspends the first task that is being executed. In another aspect, the first task may be related to user experience. Because user experience is affected after the first task is interrupted or suspended, the user does not want the first task to be interrupted or suspended.

For example, when the authorization manner supported by the electronic device is pop-up authorization, the first task may include: running a game application in full screen, playing a video in full screen, and the like. A display of the electronic device needs to be used for both pop-up authorization and running of a game application/video application in full screen. In addition, the user is unwilling to interrupt running of the game application/video application in full screen, which affects user experience.

For another example, when the authorization manner supported by the electronic device is facial verification authorization, the first task may include: running a photographing application. A camera of the electronic device needs to be used for both facial verification authorization and the photographing application, and user experience is affected if photographing is interrupted.

For another example, when the electronic device is a smart headset, the electronic device may support voice instruction authorization, and the first task may not include: playing music or a game sound effect by using the smart headset. When playing music or a game sound effect, the smart headset may simultaneously play prompt information and receive a voice instruction entered by the user. In addition, the user is not disturbed, and user experience is not affected.

In this embodiment of this disclosure, different electronic devices may correspond to a same first task, or may correspond to different first tasks. This is not limited herein.

That the electronic device cannot obtain authorization from the user in time may include the following two cases: 1. In a current scenario, the electronic device cannot directly provide an authorization manner for user authorization, and the user needs to perform more operations. For example, when the electronic device locks the screen, the electronic device can provide an authorization manner for user authorization only after the user performs an unlock operation on the electronic device. 2. When the user is not next to the electronic device, the electronic device cannot obtain authorization from the user within preset time. Specifically, when a distance between the user and the electronic device is greater than a first value, the electronic device cannot obtain the authorization from the user within the preset time. For example, when the electronic device is not carried by the user or is relatively far away from the user, the electronic device cannot obtain the authorization from the user within the preset time after providing an authorization manner.

For a policy used when the electronic device selects one electronic device from electronic devices in the distributed system as an authorization device, refer to related descriptions in the following method embodiments. Details are not described herein.

In the following embodiments of this disclosure, the authorization device meets the authorization condition, and is configured to request the user to grant the aforementioned permission required for the access request. That is, the authorization device is only an intermediate device used when the electronic device accesses a resource, and actually is not a device directly involved in a resource access process.

First, a communications system provided in an embodiment of this disclosure is described below.

As shown in FIG. 1, this embodiment of this disclosure provides a communications system 10. The communications system 10 includes a plurality of electronic devices. The communications system 10 may also be referred to as a distributed system 10.

The plurality of electronic devices included in the distributed system 10 are all intelligent terminal devices, and may be of various types. Specific types of the plurality of electronic devices are not limited in this embodiment of this disclosure. For example, the plurality of electronic devices include a mobile phone, may further include a tablet computer, a desktop computer, a laptop computer, a handheld computer, a notebook computer, a smart screen, a wearable device, an augmented reality (augmented reality, AR) device, a virtual reality (virtual reality, VR) device, an artificial intelligence (artificial intelligence, AI) device, a head unit, a smart headset, and a game console, and may further include an internet of things (internet of things, IOT) device or a smart home device such as a smart water heater, a smart lamp, or a smart air conditioner. This is not limited thereto. The plurality of devices in the distributed system 10 may further include a non-portable terminal device such as a laptop computer (laptop) with a touch-sensitive surface or a touch panel, or a desktop computer with a touch-sensitive surface or a touch panel, and the like.

When the plurality of electronic devices in the distributed system 10 are devices all deployed at home, the distributed system 10 may also be referred to as a home distributed system.

The plurality of electronic devices in the distributed system 10 may be connected to each other by logging in to a same account. For example, the plurality of electronic devices may log in to a same Huawei ID, and may be remotely connected to and communicate with each other through a server.

Alternatively, the plurality of electronic devices in the distributed system 10 may log in to different accounts, but are connected to each other in a binding manner. After one electronic device logs in to an account, the electronic device may be bound to another electronic device that logs in to a different account or that is not logged in to in a device management application, and then the electronic devices may communicate with each other by using the device management application.

Alternatively, communication connections between the plurality of electronic devices in the distributed system 10 may be established by scanning QR code, near field communication (near field communication, NFC) OneHop, searching for a Bluetooth device, or the like. This is not limited herein.

In general, communication connections established between the plurality of electronic devices in the distributed system 10 may include but are not limited to: a wired connection, a wireless connection such as a Bluetooth (Bluetooth, BT) connection, a wireless local area network (wireless local area networks, WLAN) connection such as a wireless fidelity point to point (wireless fidelity point to point, Wi-Fi P2P) connection, a near field communication (near field communication, NFC) connection, an infrared (infrared, IR) technology connection, and a remote connection (for example, a connection established through a server).

In addition, the plurality of electronic devices in the distributed system may also be connected to and communicate with each other in the foregoing manners. This is not limited in this embodiment of this disclosure.

The electronic devices in the distributed system 10 may be further classified into a thin device and a rich device based on a device type. In this embodiment of this disclosure, the rich device may be an electronic device that meets an authorization condition, and the thin device may be an electronic device that does not meet an authorization condition. For a definition of the authorization condition, refer to the foregoing related descriptions.

When the distributed system 10 includes the rich device and the thin device, a connection may be established between the rich device and the thin device in a binding manner. For example, a device management application is installed in the rich device, and the device management application may be logged in to by using an account. Then, the rich device may discover a nearby thin device (for example, an electronic device 200) by using QR code scanning, NFC, Bluetooth, or the like, and then bind, based on a user operation, the thin device to the account used by the rich device to log in to the device management application.

After the thin device is bound to the account used by the rich device to log in to the device management application, the rich device may manage the thin device by using the device management application. For example, the rich device sends various instructions to the thin device, to indicate that the thin device performs corresponding operations. The rich device may be referred to as a control device or a management device of the thin device.

After the thin device is bound to the account used by the rich device to log in to the device management application, the thin device may use the account as an owner (owner) account of the thin device, and may be added to the distributed system by using the owner account, to communicate with another electronic device in the distributed system.

In some embodiments, the thin device may directly establish a connection to another device, and communicate with the another electronic device. Each time the thin device communicates with the another device, the thin device carries the owner account of the thin device. The another electronic device may learn, by using the owner account, that the device is the thin device, and may query the control device of the thin device.

In some other embodiments, the thin device may communicate with another electronic device through the rich device. For example, the thin device may send, to the rich device, a message that the thin device wants to send to the another electronic device, and then the rich device forwards the message to the another electronic device.

The plurality of electronic devices in the distributed system 10 may be configured with different software operating systems (operating system, OS), which include but are not limited to Harmony®, Android®, iOS®, Windows®, and Linux®. Harmony® is Huawei HarmonyOS.

The plurality of electronic devices may be configured with a same software operating system, for example, may be all configured with Harmony®. When all the software systems of the plurality of electronic devices are Harmony®, the distributed system 10 may be considered as a hyper terminal.

In this embodiment of this disclosure, conventional applications (application, APP) such as a camera application, a gallery application, and a setting application may be installed in the devices in the distributed system 10. In subsequent embodiments, the conventional APP may be referred to as an APP for short.

In addition, a distributed application (distributed application) may be installed in the distributed system 10 provided in this embodiment of this disclosure. The distributed application may be a system application, or may be a third-party application. This is not limited herein.

Different from an APP with various abilities (ability), the distributed app can be deployed based on a single ability as a unit. One distributed application includes one or more functional components.

The functional component is a minimum ability unit that can be run independently in an electronic device, and is a concept in which a single ability is abstracted and encapsulated. The APP integrates a plurality of functions, but the functional component uses each function as an independent service-oriented basic ability, and exists independently. That is, the functional component is a program entity that implements a single function.

Each functional component can be independently downloaded, installed, and run. A plurality of functional components that form a same distributed application may be deployed in a same electronic device in the distributed system 10, or may be deployed in different electronic devices.

The "functional component" is merely a word used in the embodiments, a meaning represented by the "functional component" has been recorded in the embodiments, and the name of the word does not constitute any limitation on the embodiments. In addition, in some other embodiments of this disclosure, the functional component may also be referred to as another term such as a system component, a system service, or a service function. The "functional component" is used in subsequent embodiments of this disclosure for description.

Harmony® is used as an example. The functional component in Harmony® may include the following two types: (1) Feature Ability, FA.

The FA is a functional component including one or more groups of UIs, and can provide an ability of interacting with a user. For example, a navigation interface in a map application, a video call interface in an instant messaging application, and the like may be implemented as FAs.

In some embodiments, the FA separates a view UI from a service logic based on an MVVM (model-view-view-model) development mode, and service logic code and view UI code are separately deployed. For example, an electronic device may integrate the service logic code and another APP for installation, and the view UI code may be installed in another electronic device. The device in which the view UI code is located may communicate with the device in which the service logic code is located, to obtain data required for UI display.

The FA supports page template abilities such as an empty ability, a login ability, and a setting ability. The FA provides a declarative development mode by using a java script (java script, JS) language, uses an HTML-like language and a cascading style sheet (cascading style sheet, CSS) declarative programming language as development languages of page layout and page style, and supports the JS language conforming to the ECMAScript specification to provide a page service logic.

The FA has abilities such as installation-free, independent running, cross-device UI migration, and cross-device binary migration. The FA can be further deployed across devices and executed in a distributed manner.

The FA can invoke an AA or an APP to implement more and more complex functions.

(2) Particle Ability, PA.

The PA is a functional component without UI, and can provide support for the FA. For example, the PA can run in the background to provide a computing capability or act as a data warehouse to provide a data access capability. For example, a beauty function, a positioning function, an audio/video encoding and decoding function, and the like may be encapsulated as PAs.

Likewise, the PA can be deployed across devices and executed in a distributed manner. The PA is dependent only on a system service but independent of one another.

Actually, the PA encapsulates the implementations such as remote virtualization, remote invoking, PA management, cross-platform compatibility, and security, and opens cross-device service enabling and wake-up to developers. In this way, other devices can invoke the computing capability that is available on a local device, to collaborate with the other devices to complete computing. The PA supports a service ability, a data ability, and the like. The service ability is used to provide the ability of running a task in the background. The data ability is used to provide unified data access abstraction for external systems.

The PA can invoke an FA or an APP to implement more and more complex functions.

It may be understood that the "FA" and the "PA" are merely words used in this embodiment, and may also be referred to as other terms in some other embodiments of this disclosure. For example, the "PA" and the "FA" may also be referred to as other terms such as an atomic ability (atomic ability, AA), an atomic application, an atomic ability, an atomic service, and a feature ability.

A plurality of functional components that form one distributed application may be developed or provided by a same developer, or may be respectively developed or provided by a plurality of developers. This is not limited herein. Different developers jointly develop functional components, so that development efficiency of the distributed application can be improved.

In this embodiment of this disclosure, the functional component provides a standard interface for external systems for being invoked. The APP may invoke the functional component. In some cases, the functional component may also invoke another functional component or another APP. In addition, the invoked functional component may continue to invoke another functional component or another APP. Such a multi-level invoking manner may be referred to as chain invoking.

Figure 2:
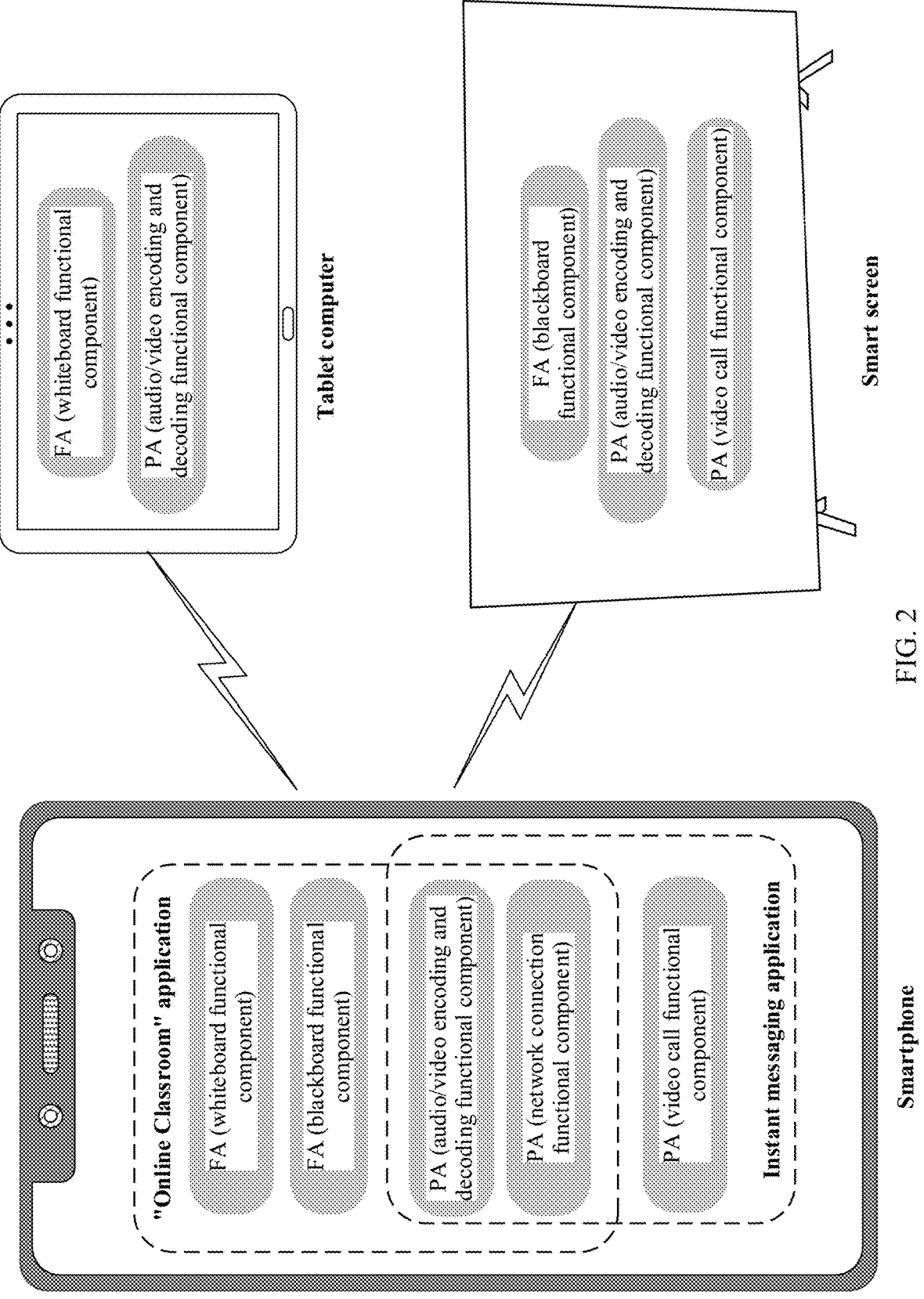
FIG. 2 shows a distributed scenario according to an embodiment of this disclosure.

FIG. 2 shows an example of a possible distributed remote teaching service scenario.

As shown in FIG. 2, a distributed system includes electronic devices such as a smartphone, a tablet computer, and a smart screen. The devices in the distributed system are connected to each other. The smartphone, the tablet computer, and the smart screen may be configured with different software operating systems (operating system, OS). For example, the smartphone and the tablet computer may be configured with the Android® system, and the smart screen may be configured with the Harmony® system.

"Online Classroom" is installed in the smartphone. The "Online Classroom" is an application that is installed in an electronic device and that provides various functions required for a teacher and a student to attend a remote class. A name of the application is not limited in this embodiment of this disclosure. The "Online Classroom" may include the following functional components: a blackboard functional component, a whiteboard functional component, an audio/video encoding and decoding functional component, and a network connection functional component. The blackboard functional component and the whiteboard functional component belong to the FAs, and the audio/video codec functional component and the network connection functional component belong to the PAs. The blackboard functional component provides the function of explaining a course remotely. The whiteboard functional component provides the function of answering a question remotely. The audio/video encoding and decoding functional component provides the function of encoding and decoding audio or a video.

On the teacher side, when using the "Online Classroom" on the smartphone, a teacher may migrate or switch the blackboard functional component to the smart screen, to explain a course on the smart screen.

On the student side, when using the "Online Classroom" on the smartphone, a student can migrate or switch a whiteboard functional component to the tablet computer, to answer a question on the tablet computer.

That a functional component is migrated or switched from one device A to another device B may include the following two cases: 1. UI migration. When the view UI of the FA is separated from the service logic of the FA, and the device A may run the service logic code, the device B can be triggered to run the view UI code. It seems to the user that the functional component is migrated from the device A to the device B. 2. Overall migration. The overall migration means that the device B runs the functional component and provides a corresponding function after the functional component is downloaded and installed in the device B from the device A or from a network.

In the remote teaching service scenario, the "Online Classroom" is an invoker, and the whiteboard functional component in the tablet computer and the blackboard functional component in the smart screen are invokees.

FIG. 2 further shows another possible distributed video call service scenario.

As shown in FIG. 2, another distributed application such as an instant messaging application may be further installed in the smartphone. The instant messaging application may provide a video call function, a voice call function, and another communication function. The instant messaging application may include the following functional components: a video call functional component, an audio/video encoding and decoding functional component, and a network connection functional component.

When using the instant messaging application on the smartphone, the user may migrate or switch the video call functional component of the application to the smart screen, to make a video call by using a camera and a display of the smart screen.

The blackboard functional component in the foregoing "Online Classroom" and the video call functional component in the instant messaging application may be a same functional component. That is, the functional component in the smart screen may be separately invoked by the "Online Classroom" and the instant messaging application that are installed in the smartphone.

In the video call service scenario, the instant messaging application is an invoker, and the video call functional component (that is, the video call functional component) in the smart screen is an invokee.

It should be noted that the service scenario shown in FIG. 2 is merely used to assist in describing the technical solutions in embodiments of this disclosure. In an actual service scenario, the distributed system shown in FIG. 2 may include more terminal devices. More or fewer functional components may be deployed in the devices, and the distributed applications may include more or fewer functional components.

Software and hardware capabilities of different devices may be integrated by using the distributed system 10 shown in FIG. 1 and the distributed scenario shown in FIG. 2, to implement intelligent all-scenario experience.

In some embodiments, after communication connections are established between devices in the distributed system 10, the devices synchronize information about functional components and APP information of the other devices in the distributed system. Specifically, the devices may synchronize, to the other devices, names of functional components and APPs installed in the devices, to subsequently invoke the APPs, the functional components, and the like of the other devices in the distributed system 10.

In subsequent embodiments of this disclosure, a party that initiates invoking of a functional component or an APP may be referred to as an invoker. The invoker may be, for example, an APP, a service, an FA, or a PA. An initial initiator of an entire invoking chain may be referred to as a first invoker. The first invoker may be, for example, an APP or an FA. For example, if an invoking chain is as follows: an APP1 invokes a PA1, the PA1 invokes a PA2, and the PA2 invokes an FA1, the APP1 is the first invoker. For another example, if an invoking chain is as follows: an FA1 invokes a PA1, and the PA1 invokes a PA2, the FA1 is the first invoker.

In an entire invoking chain, a party invoked in the middle and a party invoked at the last may be referred to as invokees. The invokee may be, for example, an APP, an FA, or a PA.

In some embodiments of this disclosure, the invoker may also be referred to as a subject application, and the invokee may also be referred to as an object application.

In the invoking chain, the invoker and the invokee may be deployed in a same electronic device, or may be deployed in different electronic devices.

A device in which the invoker is located is referred to as a subject device, and a device in which the invokee is located is an object device.

An application described in the following embodiments of this disclosure may include an APP, or may include a functional component.

In the distributed system 10 provided in this embodiment of this disclosure:

After communication connections are established between electronic devices, the devices synchronize, to each other, information about capabilities opened by the devices to other devices and device attributes of the devices.

A capability that an electronic device opens to the other devices includes an APP, a functional component, an identifier, or the like that can be invoked. Information about capabilities opened by the electronic device to the other devices is used to indicate the foregoing capabilities, for example, may include: identifiers of an APP and a functional component that are opened by the electronic device to the other devices for invoking, and an identifier of a resource that is opened by the electronic device to the other devices for accessing.

A capability opened by an electronic device to other devices may be preset by the electronic device, or may be set by a user. This is not limited herein. For example, the electronic device may open an APP or a functional component with relatively low confidentiality or relatively low sensitivity to the other devices. For example, the electronic device may open a camera application, a gallery application, and the like to the other devices, but does not open a bank application to the other devices.

A same electronic device opens a same capability or different capabilities to other different electronic devices. This is not limited herein.

After the electronic device synchronizes, to the other devices, the capability information opened by the electronic device to the other devices, the other devices in the distributed system 10 may subsequently invoke an APP or a functional component in the electronic device based on the capability information.

Attributes of the electronic device may include one or more of the following: whether the electronic device meets an authorization condition, an authorization manner supported by the electronic device, a screen status of the electronic device, a running status of the electronic device, a distance between the electronic device and the user, and the like.

Because the screen status of the electronic device, the running status of the electronic device, and the distance between the electronic device and the user may change over time, the devices in the distributed system may periodically synchronize the information.

In some embodiments, after the subject device in the distributed system 10 sends, to the object device, an access request used to access a first resource, if the object device does not meet the authorization condition, the object device is currently executing a first task, or the object device cannot obtain authorization from the user in time, the object device may select one electronic device in the distributed system as an authorization device. The authorization device is configured to send an authorization result to the object device after requesting the user to grant a permission required for the access request. If the authorization result indicates that the user agrees to grant the permission required for the access request, the object device obtains the permission required for the access request, and may access the first resource in response to the access request.

In some embodiments, when the subject device and the object device in the distributed system 10 are a same electronic device, and after the electronic device generates an access request used to access a first resource, if the electronic device does not meet the authorization condition, the electronic device is currently executing a first task, or the electronic device cannot obtain authorization from the user in time, the electronic device may select one electronic device in the distributed system as an authorization device. The authorization device is configured to send an authorization result to the electronic device after requesting the user to grant a permission required for the access request. If the authorization result indicates that the user agrees to grant the permission required for the access request, the electronic device obtains the permission required for the access request, and may access the first resource in response to the access request.

For specific implementation of operations performed by the electronic devices in the distributed system 10, refer to related descriptions in subsequent method embodiments. Details are not described herein again.

Figure 3A:
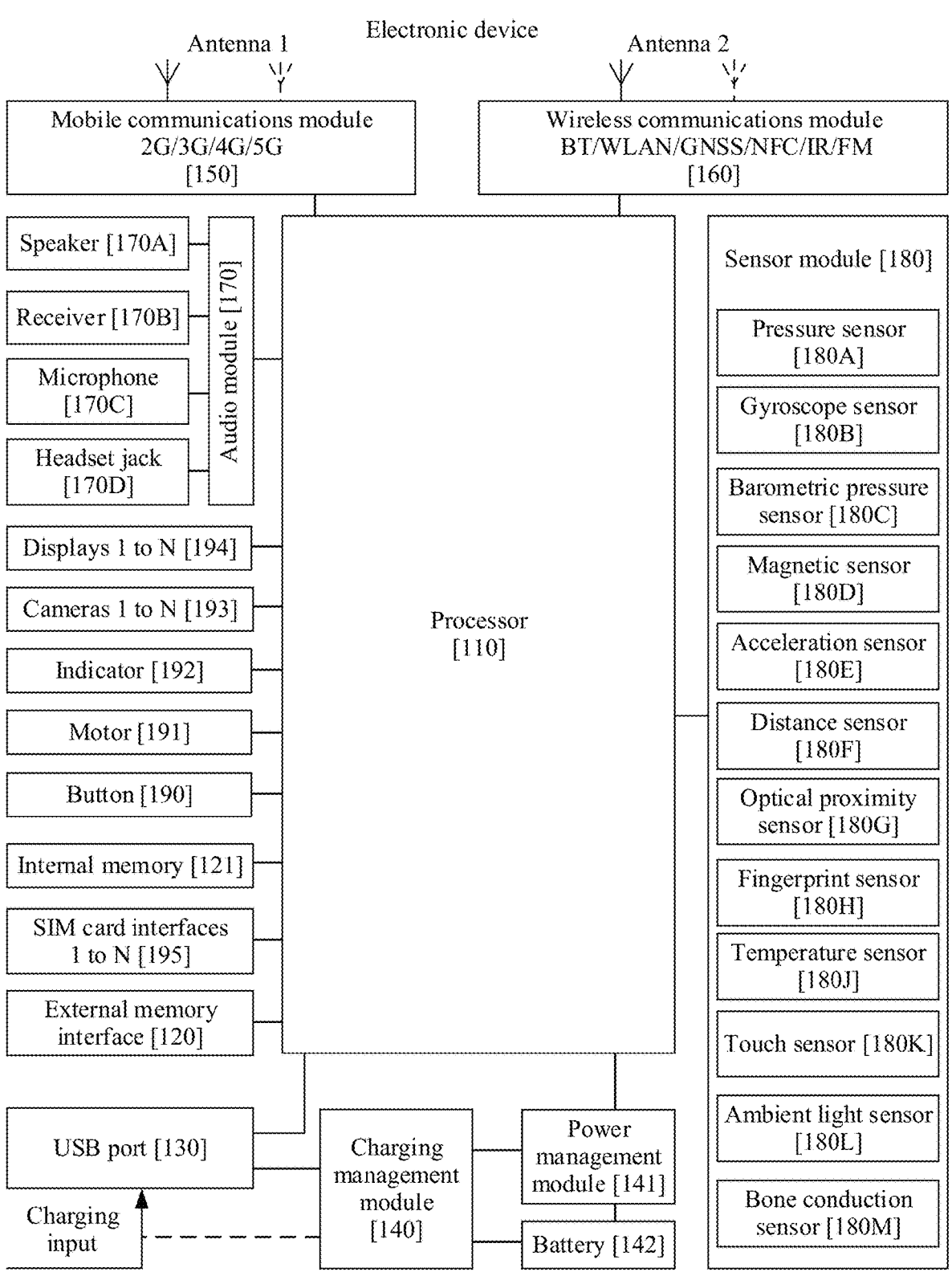
FIG. 3A is a diagram of a hardware structure of an electronic device according to an embodiment of this disclosure.

FIG. 3A is a schematic diagram of a hardware structure of an electronic device according to an embodiment of this disclosure. The electronic device may be any electronic device in the distributed system 10 shown in FIG. 1. The electronic device may be a subject device, may be an object device, may be both a subject device and an object device, or may be an authorization device.

As shown in FIG. 3A, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present disclosure does not constitute a specific limitation on the electronic device. In some other embodiments of this disclosure, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

A wireless communication function of the electronic device may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device, to wireless communication including 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution, applied to the electronic device, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave through the antenna 2, performs demodulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a mode of transmission between human brain neurons, and may further continuously perform self-learning. The NPU can implement applications such as intelligent cognition of the electronic device, for example, image recognition, facial recognition, voice recognition, and text understanding.

The internal memory 121 may include one or more random access memories (random access memory, RAM) and one or more non-volatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5

SDRAM), and the like. The non-volatile memory may include a magnetic disk storage device, and a flash memory (flash memory).

The random access memory may be directly read and written by using the processor 110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance to be directly read and written by using the processor 110.

The external memory interface 120 may be configured to connect to an external non-volatile memory, to extend a storage capability of the electronic device. The external non-volatile memory communicates with the processor 110 through the external memory interface 120, to implement a data storage function. For example, files such as music and videos are stored in the external non-volatile memory.

The electronic device may implement audio functions such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt.

The indicator 192 may be an indicator light, and may be configured to indicate a charging status and a power change, or may be configured to indicate a message, a missed call, a notification, and the like.

The pressure sensor 180A is configured to sense a pressure signal, and can convert the pressure signal into an electrical signal. In some embodiments, the pressure sensor 180A may be disposed on the display 194.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may be alternatively disposed on a surface of the electronic device, and is located on a position different from that of the display 194.

When the electronic device shown in FIG. 3A is a subject device:

The mobile communications module 150 or the wireless communications module 160 may be configured to establish a communication connection to another electronic device in the distributed system 10. For a specific manner of establishing the communication connection, refer to related descriptions in FIG. 2.

The mobile communications module 150 or the wireless communications module 160 may be further configured to: after the communication connection to the another electronic device is established, receive capability information that is opened to the subject device and that is synchronized by the another electronic device.

The mobile communications module 150 or the wireless communications module 160 may be further configured to send, to the object device, an access request used to access a first resource, where both an invokee and a resource that are to be accessed by the access request fall within a capability opened by the object device.

The display 194 may be configured to display a user interface that is displayed on the subject device and that is provided in subsequent embodiments.

The internal memory 121 may be configured to store open capability information synchronized by the another electronic device in the distributed system 10.

When the electronic device shown in FIG. 3A is an object device:

The mobile communications module 150 or the wireless communications module 160 may be configured to establish a communication connection to another electronic device in the distributed system 10. For a specific manner of establishing the communication connection, refer to related descriptions in FIG. 2.

The mobile communications module 150 or the wireless communications module 160 may be further configured to: after the communication connection to the another electronic device is established, synchronize, to the another electronic device, capability information opened to the object device.

The mobile communications module 150 or the wireless communications module 160 may be further configured to receive an access request that is sent by the subject device and that is used to access a first resource, where both an invokee and a resource that are to be accessed by the access request fall within a capability opened by the object device to the subject device.

The processor 110 may be configured to determine whether the object device meets an authorization condition, whether the object device is currently executing a first task, or whether the object device can obtain authorization from the user in time. The processor 110 is further configured to: when determining that the object device does not meet the authorization condition, the object device is currently executing the first task, or the object device cannot obtain authorization from the user in time, select one electronic device in the distributed system as an authorization device. For a policy used when the processor 110 selects an authorization device, refer to related descriptions in subsequent method embodiments.

The mobile communications module 150 or the wireless communications module 160 may be further configured to receive an authorization result that is sent by the authorization device and that is used by the authorization device to request the user to grant a permission required for the access request.

The processor 110 may be configured to: when the authorization result indicates that the user agrees to grant the permission required for the access request, invoke modules in the object device and access the first resource in response to the access request. For a manner in which the processor 110 responds to the access request, refer to descriptions in subsequent method embodiments.

When the electronic device shown in FIG. 3A is both a subject device and an object device, the operations performed by modules in the foregoing subject device and the foregoing object device are all performed by the electronic device, and the step of communication between the subject device and the object device may be omitted. For the operations performed by modules in the electronic device, refer to the foregoing related descriptions. Details are not described herein again.

When the electronic device shown in FIG. 3A is an authorization device:

The mobile communications module 150 or the wireless communications module 160 may be configured to establish a communication connection to another electronic device in the distributed system 10. For a specific manner of establishing the communication connection, refer to related descriptions in FIG. 2.

The mobile communications module 150 or the wireless communications module 160 may be further configured to receive a message that is sent by the object device and that is used to request the user to grant a permission required for the access request. The processor 110 may invoke modules (for example, the display 194, the fingerprint sensor 180H, the camera 193, the audio module 170, and the button 190) in the authorization device in response to the message, provide corresponding authorization manners, and request the user to grant the permission required for the access request.

The modules such as the display 194, the fingerprint sensor 180H, the camera 193, the audio module 170, the button 190 may be configured to provide various authorization manners, to request the user to grant the permission required for the access request. The processor 110 may determine an authorization result in response to user operations received by the foregoing modules.

The mobile communications module 150 or the wireless communications module 160 may be further configured to send the authorization result to the object device.

Figure 3B:
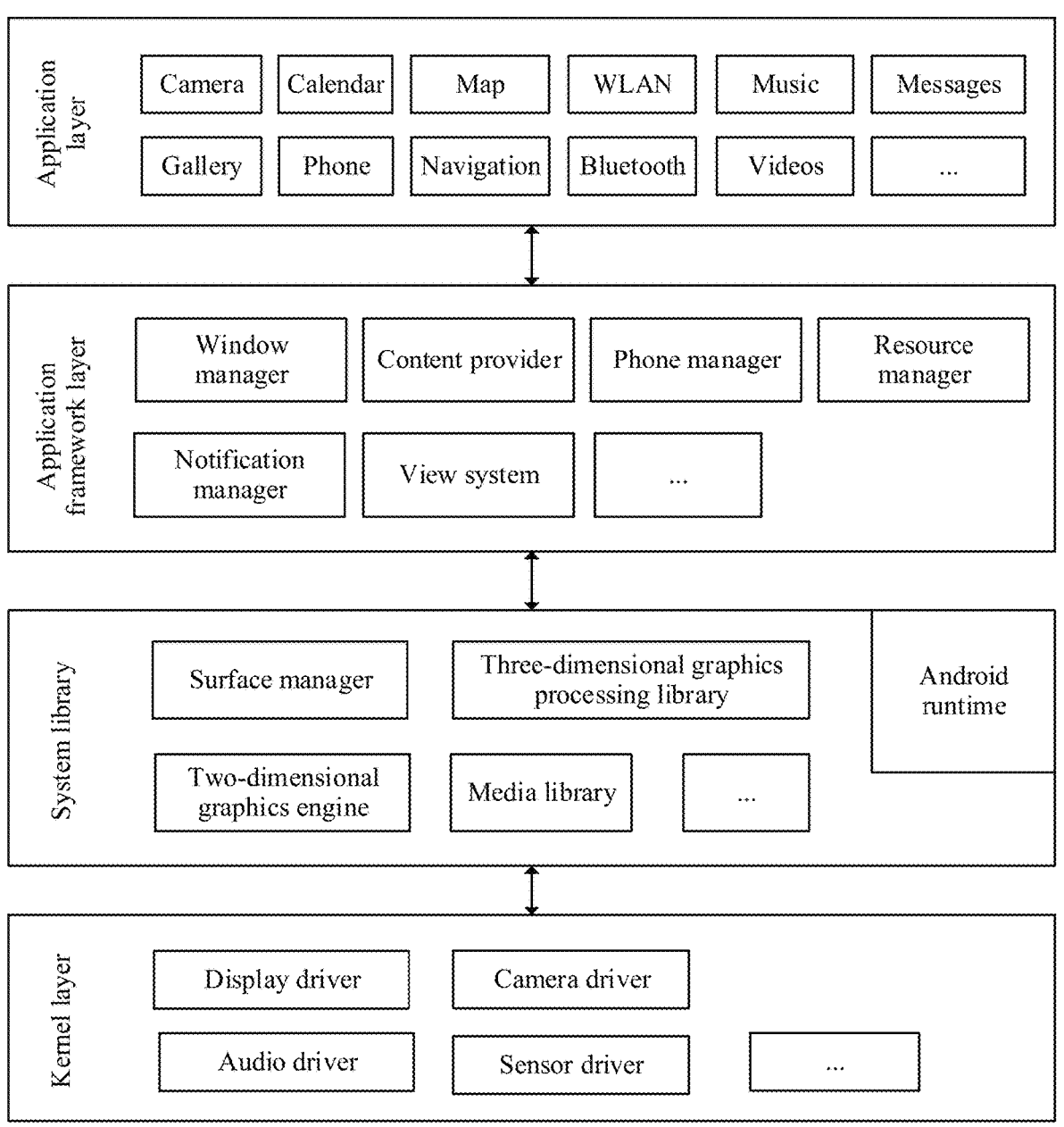
FIG. 3B is a diagram of a software structure of an electronic device according to an embodiment of this disclosure.

FIG. 3B is a schematic diagram of a software structure of an electronic device according to an embodiment of this disclosure. The electronic device may be any electronic device in the distributed system 10 shown in FIG. 1. The electronic device may be a subject device, may be an object device, may be both a subject device and an object device, or may be an authorization device.

A software system of the electronic device may use a layered architecture, an event-driven architecture, a micro-kernel architecture, a microservice architecture, a cloud architecture, or the like. For example, the software system of the electronic device includes but is not limited to Harmony®, iOS®, Android®, Windows®, Linux, or another operating system.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3B, the application packages may include applications such as Camera, Gallery, Calendar, Phone, Map, Navigation, WLAN, Bluetooth, Music, Videos, and Messages. The application layer may further include functional components such as an FA, a PA, and the like.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3C:
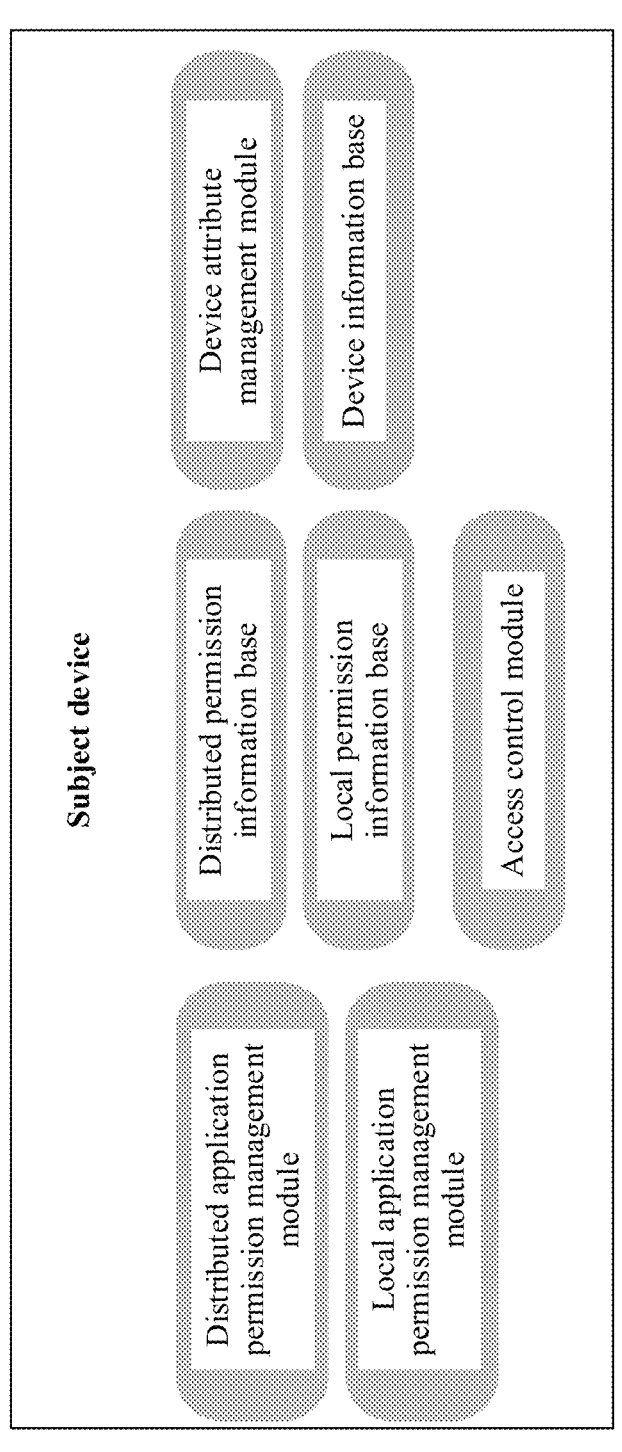
FIG. 3C is a diagram of a software structure of a subject device according to an embodiment of this disclosure.

FIG. 3C is a schematic diagram of a software structure of a subject device according to an embodiment of this disclosure.

As shown in FIG. 3C, the subject device may include the following modules: a distributed application permission management module, a local application permission management module, a distributed permission information base, a local permission information base, an access control module, a device attribute management module, and a device information library. Details are as follows:

The distributed application permission management module is configured to synchronize, to the subject device, capability information opened by another device (for example, an object device) in the distributed system 10, and may further be configured to synchronize, to another electronic device, capability information opened by the subject device to another device.

The distributed permission information base is configured to store capability information opened by another device (for example, an object device) in the distributed system 10 to the subject device, and may be further configured to store capability information opened by the subject device to another device.

The local application permission management module is configured to manage permissions for applications (including an APP and a functional component) in the subject device to use a capability opened by another device in the distributed system 10 to the subject device. For details about permissions for the applications in the subject device to use a capability opened to another device, refer to related descriptions in the following method embodiments. Details are not described herein.

The local permission information base is configured to store information about permissions for applications (including an APP and a functional component) in the subject device to use a capability opened by another device in the distributed system 10 to the subject device.

The access control module is configured to: when the subject device initiates an access request to the object device, first query, by using the distributed application permission management module, whether the object device has opened a permission required for the access request to the subject device, and then query, by using the local application permission management module, whether an invoker that initiates the access request has the permission required for the access request. When results of the two queries are both yes, the access control module determines that the subject device may initiate the access request to the object device.

The device attribute management module is configured to synchronize an attribute of the subject device to another device (for example, an object device) in the distributed system, and further configured to synchronize a device attribute of another device to the subject device. For specific content of an attribute of the electronic device, refer to related descriptions in the foregoing and subsequent method embodiments.

The device information library is configured to store and maintain an attribute of the subject device and an attribute synchronized from the another device in the distributed system.

FIG. 3C is merely an example. The subject device provided in this embodiment of this disclosure may further include more or fewer modules. This is not limited herein.

The modules in the subject device mentioned in FIG. 3C may be located at the application layer, the application framework layer, the system service layer, the kernel layer, and the like in the electronic device shown in FIG. 3B. This is not limited herein.

Figure 3D:
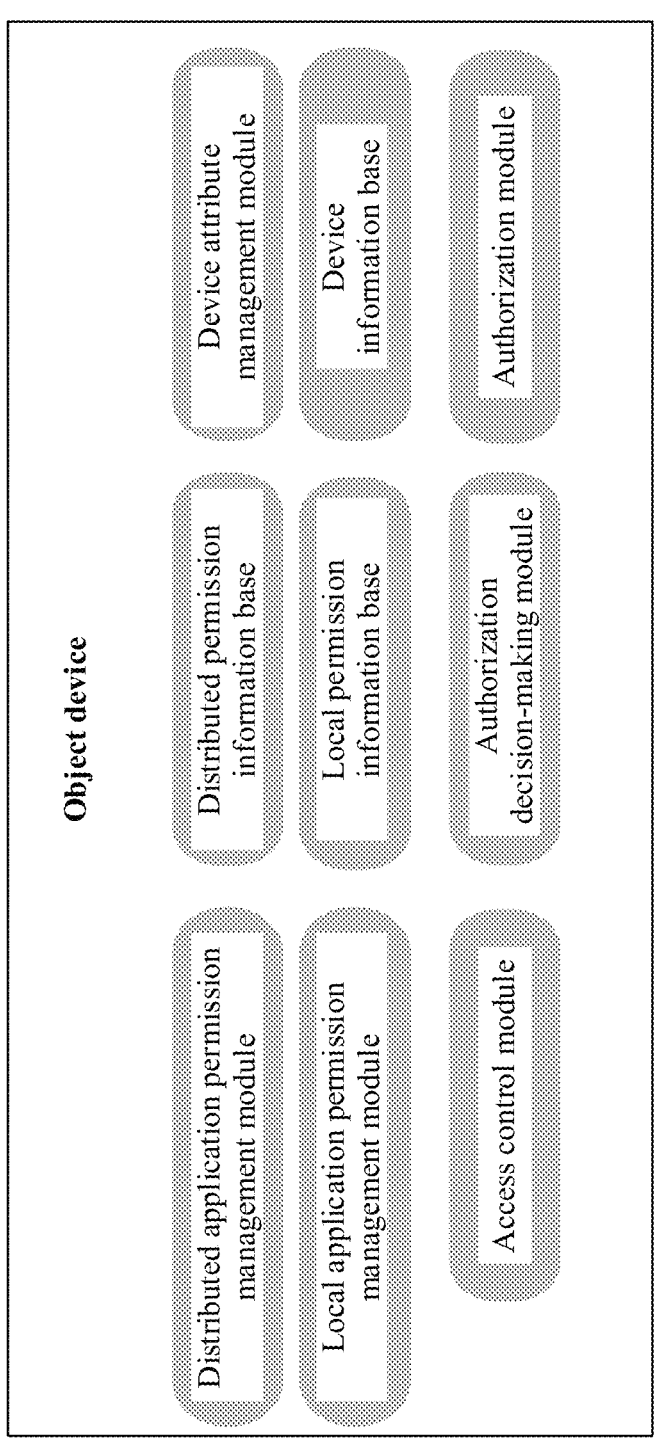
FIG. 3D is a diagram of a software structure of an object device according to an embodiment of this disclosure.

FIG. 3D is a schematic diagram of a software structure of an object device according to an embodiment of this disclosure.

As shown in FIG. 3D, the object device may include the following modules: a distributed application permission management module, a local application permission management module, a distributed permission information base, a local permission information base, a device attribute management module, a device information library, an authorization module, an authorization decision-making module, and an access control module. Details are as follows:

The distributed application permission management module is configured to synchronize, to another electronic device, capability information opened by the object device to another device (for example, a subject device), and is further configured to synchronize capability information opened by another device (for example, a subject device) in the distributed system 10 to the object device.

The distributed permission information base is configured to store capability information opened by the object device to another device, and may be further configured to store capability information opened by another device (for example, a subject device) in the distributed system 10 to the object device.

The local application permission management module is configured to manage permissions for applications (including an APP and a functional component) in the object device to use resources of the applications. For details about permissions for the applications in the object device to use resources of the applications, refer to related descriptions in the following method embodiments. Details are not described herein.

The local permission information base is configured to store information about permissions for the applications (including an APP and a functional component) in the object device to use resources of the applications.

The device attribute management module is configured to synchronize an attribute of another device to the object device, and may be further configured to synchronize an attribute of the object device to the another device in the distributed system. For specific content of an attribute of the electronic device, refer to related descriptions in the foregoing and subsequent method embodiments.

The device information library is configured to store and maintain an attribute of the object device and an attribute synchronized from the another device in the distributed system.

The access control module is configured to: when receiving an access request initiated by a subject device to the object device, first query, by using the distributed application permission management module, whether the object device has opened a permission required for the access request to the subject device. When the object device has opened the permission to the subject device, the access control module may check whether the user has granted the permission required for the access request. When the user has granted the permission required by the access request, the access control module determines that the object device may respond to the access request.

The authorization module is configured to determine whether the object device meets an authorization condition, whether the object device is currently executing a first task, or whether the object device can obtain authorization from the user in time.

If the object device does not meet the authorization condition, the object device is currently executing the first task, or the object device cannot obtain authorization from the user in time, the authorization module may select an authorization device by using the authorization decision-making module. Then, the authorization module sends an authorization request to the authorization device, and receives an authorization result returned by the authorization device. When the authorization result indicates that the user agrees to grant the permission required for the access request, the authorization module obtains the permission required for the access request.

If the object device meets the authorization condition, the object device is currently not executing the first task, and the object device can currently obtain authorization from the user in time, the authorization module may invoke software and hardware resources of the object device and provide an authorization manner, to obtain the permission that is granted by the user and that is required for the access request.

The authorization decision-making module is configured to select one electronic device in the distributed system as an authorization device based on a type of the object device and the attribute of the another electronic device in the distributed system. In some embodiments, the authorization decision-making module may be further configured to determine an authorization manner used by the authorization device.

FIG. 3D is merely an example. The object device provided in this embodiment of this disclosure may further include more or fewer modules. This is not limited herein.

The modules in the object device mentioned in FIG. 3D may be located at the application layer, the application framework layer, the system service layer, the kernel layer, and the like in the electronic device shown in FIG. 3B. This is not limited herein.

The following describes in detail an access control method provided in embodiments of this disclosure based on the distributed system 10 shown in FIG. 1, the hardware structure of the electronic device shown in FIG. 3A, the software structure of the electronic device shown in FIG. 3B, the software structure of the subject device shown in FIG. 3C, and the software structure of the object device shown in FIG. 3D.

Figure 4:
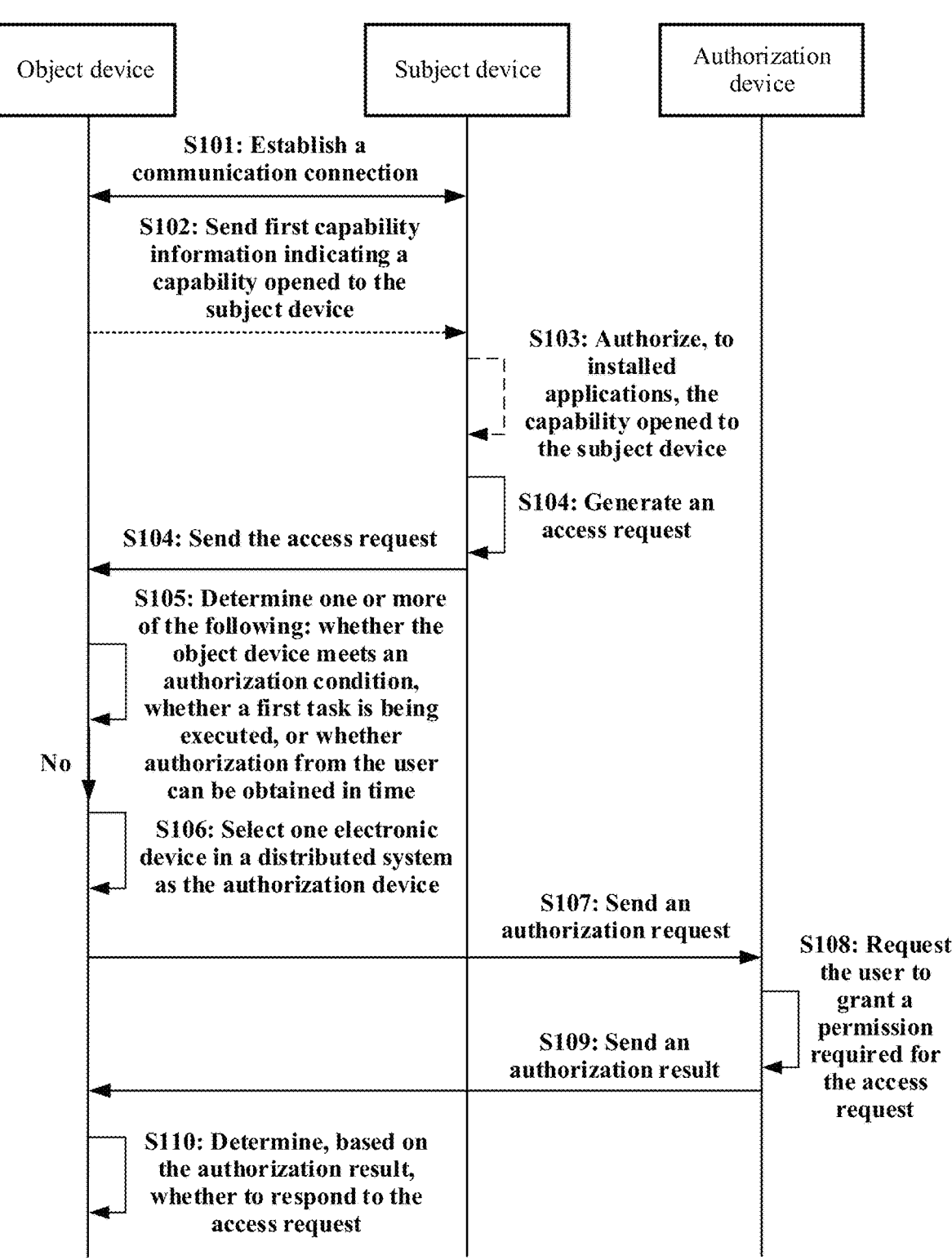
FIG. 4 is a flowchart of a flexible authorization access control method according to an embodiment of this disclosure.

FIG. 4 is a flowchart of a flexible authorization access control method according to an embodiment of this disclosure. The method shown in FIG. 4 is described by using an example in which the subject device invokes a resource in the object device.

As shown in FIG. 4, the method may include the following steps.

S101: The subject device establishes a connection to the object device.

A manner of establishing a communication connection between the subject device and the object device is not limited in this embodiment of this disclosure. For example, the communication connection may be established by logging in to a same account, binding a device, scanning QR code, or the like. A type of the communication connection established between the subject device and the object device is not limited in this embodiment of this disclosure. For example, the communication connection may include a wired connection, a wireless connection such as a Bluetooth connection, a Wi-Fi P2P connection, an NFC connection, an IR connection, a remote connection, and the like. For details, refer to related descriptions in FIG. 1.

Optionally, in step S102, the object device sends first capability information to the subject device, where the first capability information indicates an APP, a functional component, and a resource that are opened by the object device to the subject device for invoking.

The first capability information may include one or more of the following: an identifier of the APP, an identifier of the functional component, or an identifier of the resource opened by the object device to the subject device for invoking.

In some embodiments, a capability opened by the object device to the subject device may be preset by the object device. For example, the object device may open an APP, a functional component, or a resource with relatively low confidential or relatively low sensitive to the subject device. For example, the object device may open a camera application, a gallery application, and the like to another device, but does not open a bank application, a stored password, and the like to the another device.

In some other embodiments, a capability opened by the object device to the subject device may alternatively be set by the user. The object device may receive a user operation used to set a capability opened to the subject device, and determine, in response to the user operation, the capability opened to the subject device.

Figure 5A:
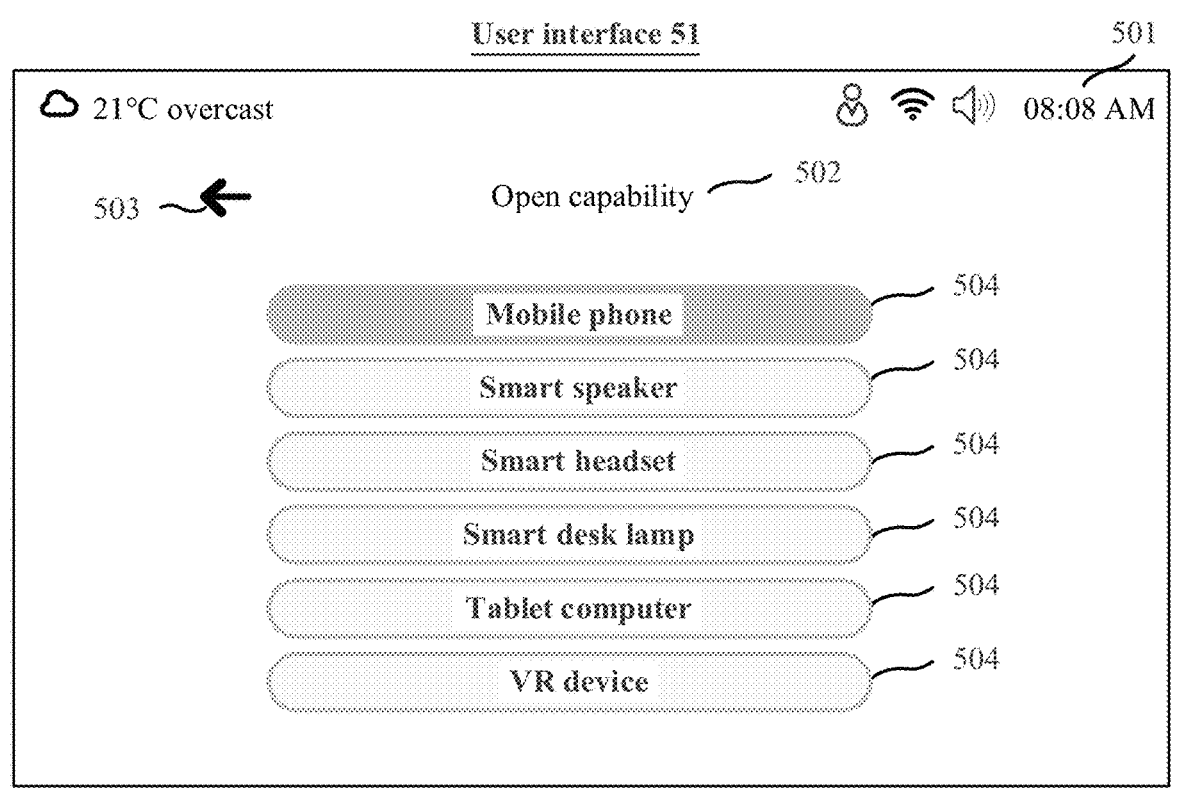
FIG. 5A and FIG. 5B show a group of user interfaces implemented on an object device according to an embodiment of this disclosure.
Figure 5B:
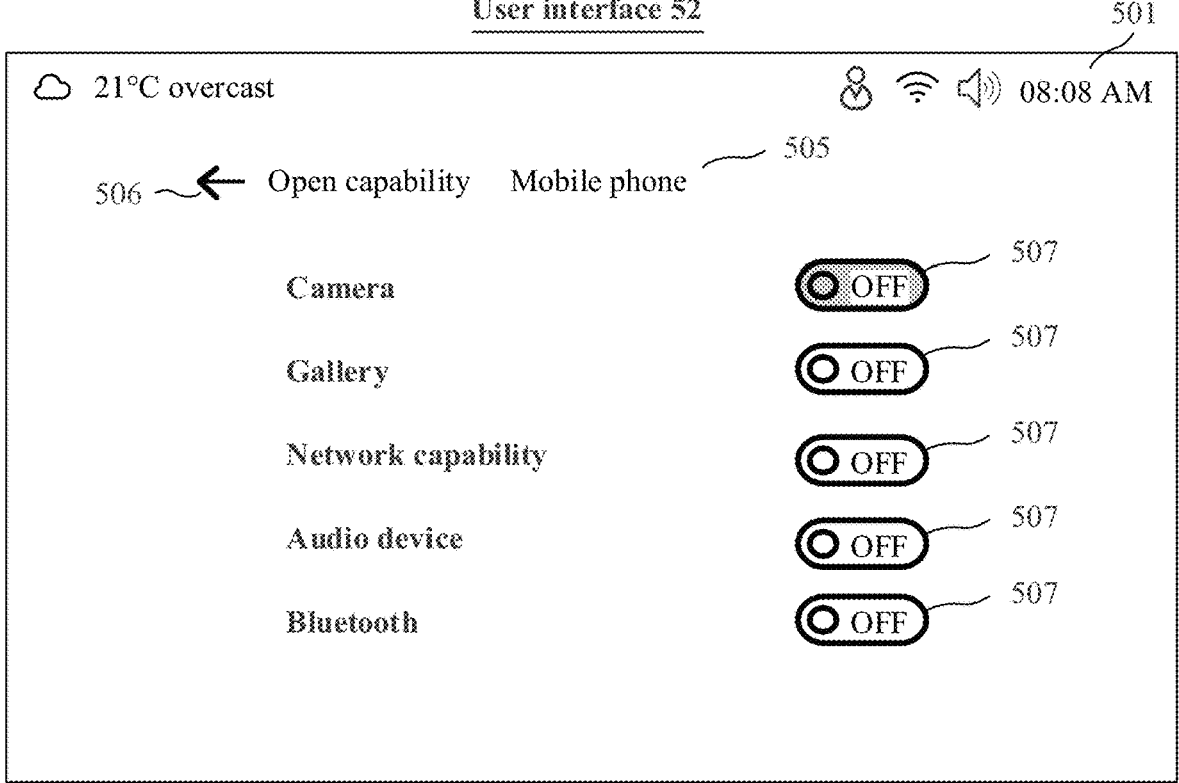

FIG. 5A and FIG. 5B show an example of a manner in which the user sets a capability opened by an object device to a subject device.

In the example in FIG. 5A and FIG. 5B, the object device may be a smart screen, and the subject device may be a mobile phone.

FIG. 5A shows a user interface 51 provided by a setting application in the object device. The setting application is an application installed in the electronic device, and used to set functions in the electronic device. A name of the application is not limited in this embodiment of this disclosure.

As shown in FIG. 5A, a status bar 501, a page indicator 502, a back button 503, and one or more device options 504 are displayed in the user interface 51.

The status bar 501 may include: one or more signal strength indicators of a Wi-Fi signal, a weather indicator, a time indicator, and the like.

The page indicator 502 is used to indicate that a current page is used to set a capability opened by the object device to another device in the distributed system. The page indicator 502 may be implemented as a text such as a text "Open capability", an icon, or another form.

The back button 503 is used to return to a previous page provided by the setting application.

The one or more device options 504 correspond to electronic devices other than the object device in the distributed system 10. The device options 504 may be implemented as an image, an icon, a text, and the like. This is not limited herein.

As shown in FIG. 5A, the object device may detect a user operation performed on a device option 504 corresponding to the subject device (for example, a mobile phone). For example, the user selects the user operation of the device option 504 by using a remote control, and a user interface 52 that is shown in FIG. 5B and that is used to set a capability opened to the subject device is displayed in response to the user operation.

As shown in FIG. 5B, a status bar 501, a page indicator 505, a back button 506, and one or more options 507 used to open/stop opening capabilities to the subject device are displayed in the user interface 52.

For the status bar 501 and the back button 506, refer to related descriptions in the user interface 51.

The page indicator 505 is used to indicate that a current page is used to set a capability opened by the object device to the subject device (for example, a mobile phone).

One or more capability options 507 may correspond to one or more capabilities such as an APP, a functional component, or a resource that can be invoked in the object device. One capability option may correspond to one or more capabilities. The object device may detect a user operation performed on the capability option 507, and open, in response to the user operation, a capability corresponding to the capability option 507 to the subject device, or stop opening a capability corresponding to the capability option 507 to the subject device.

As shown in FIG. 5B, the object device may detect a user operation performed on the capability option 507, and open, in response to the user operation, capabilities corresponding to the capability option 507 to the subject device, that is, open a camera application and a camera resource of the object device to the subject device.

This is not limited to the manner shown in FIG. 5A and FIG. 5B. In specific implementation, the user may alternatively set, in another manner, a capability opened by the object device to the subject device. For example, in an interface provided by an APP, the APP may be opened to the subject device for invoking. This is not limited herein.

Optionally, in step S103, the subject device authorizes, to installed applications (including an APP and a functional component) based on the first capability information, the capability opened by the object device to the subject device.

After receiving the first capability information, the subject device may learn the capability opened by the object device to the subject device.

In some embodiments, the subject device may autonomously authorize, to the applications (including an APP and a functional component) installed in the subject device, the capability opened by the object device to the subject device. For example, the subject device may authorize, to the applications based on features of the installed applications, a capability that may be used in capabilities opened by the object device to the subject device when the subject device invokes the object device. For example, an instant messaging application may be installed in the subject device, and the subject device may authorize, to the instant messaging application, a camera resource opened by the object device to the subject device.

In some other embodiments, the user may authorize, to the applications (including an APP and a functional component) installed in the subject device, the capability opened by the object device to the subject device. The subject device may receive a user operation used to be authorized to the applications installed in the subject device, and determine, in response to the user operation, a capability that is of the object device and that can be invoked by the applications installed in the subject device.

Figure 6A:
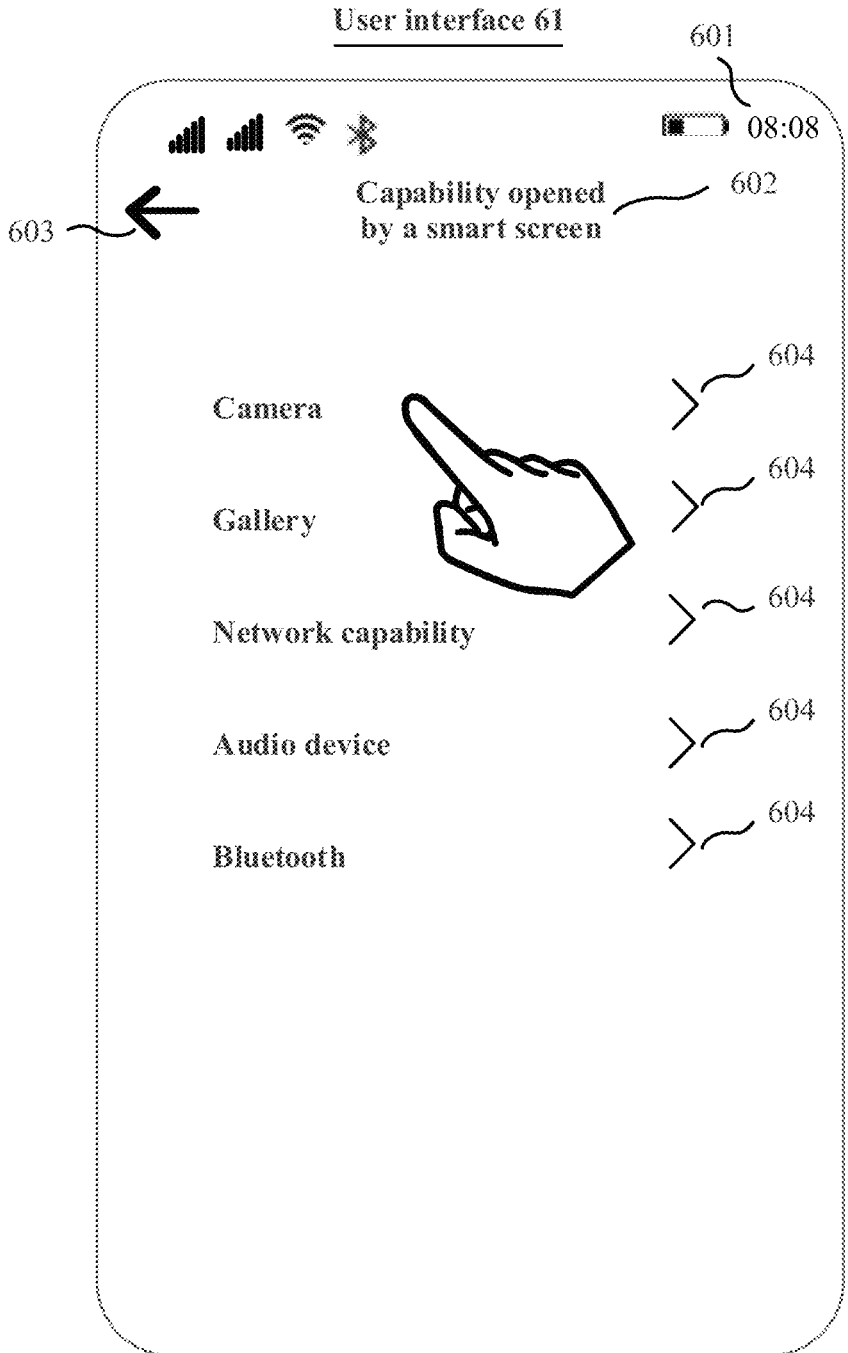
FIG. 6A to FIG. 6C show a group of user interfaces implemented on a subject device according to an embodiment of this disclosure.
Figure 6B:
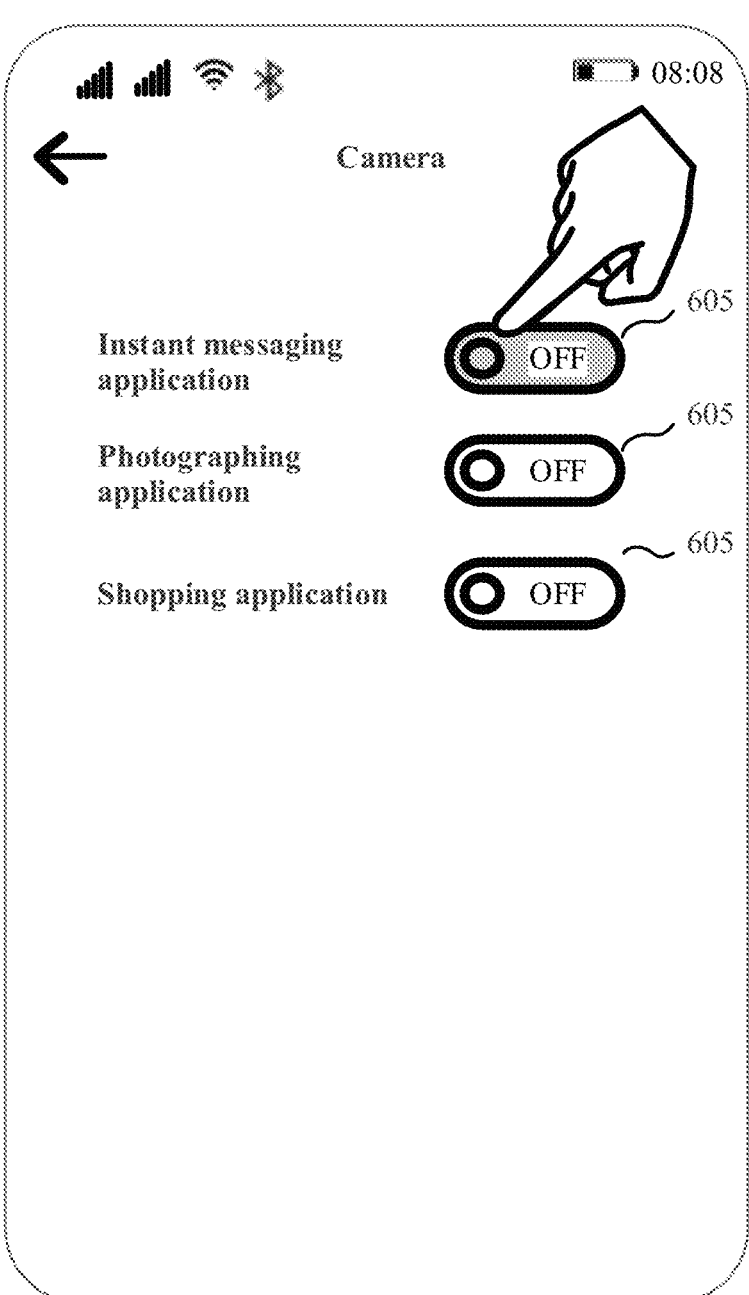

FIG. 6A and FIG. 6B show an example of a manner in which the user authorizes, to applications installed in the subject device, a capability opened by an object device to a subject device.

In the example in FIG. 6A and FIG. 6B, the object device may be a smart screen, and the subject device may be a mobile phone.

FIG. 6A shows a user interface 61 provided by a setting application in the subject device. As shown in FIG. 6A, a status bar 601, a page indicator 602, a back button 603, and one or more capability options 604 are displayed in the user interface 61.

For the status bar 601 and the back button 603, refer to related descriptions in FIG. 5A.

The page indicator 602 is used to indicate that a current page is used to authorize, to applications installed in the subject device, a capability opened by the object device to the subject device.

As shown in FIG. 6A, the subject device may detect a user operation (for example, a tap operation or a touch operation) performed on the capability option 604, and display, in response to the user operation, a user interface 62 shown in FIG. 6B.

One or more application options 605 are displayed in the user interface 62. The one or more application options 605 may correspond to all or some applications installed in the subject device, for example, may correspond to applications that are in the subject device and that may invoke a capability corresponding to the capability option 604 that receives a user operation. For example, when detecting the user operation shown in FIG. 6A, the subject device may display, in the user interface 62 shown in FIG. 6B, a series of applications such as an instant messaging application, a photographing application, and a shopping application that
are installed in the subject device and that may invoke a
camera resource.

As shown in FIG. 6B, the subject device may detect a user
operation (for example, a tap operation or a touch operation)
performed on the application option 605, and authorize, to
an application corresponding to the application option 605 in
response to the user operation, a capability corresponding to
the capability option 604 that receives the user operation.
For example, the subject device authorizes, to the instant
messaging application for use, the camera resource opened
by the object device to the subject device.

This is not limited to the manner shown in FIG. 6A and
FIG. 6B. In specific implementation, the user may further
authorize, to the applications installed in the subject device
in another manner, a capability opened by the object device
to the subject device, for example, a voice instruction is used
for authorization. This is not limited herein.

S104: The subject device generates an access request, and
sends the access request to the object device, where the
access request is used by an invoker in the subject device to
invoke an invokee in the object device, to access a first
resource.

In this embodiment of this disclosure, the invoker is
installed in the subject device, and the invokee is installed in
the object device. Both the invoker and the invokee may be
an APP or a functional component. For definitions of the
APPs and functional components, refer to the foregoing
related descriptions.

The access request generated by the subject device may
include: an identifier of the invoker, an identifier of the
invokee, and an identifier of the first resource. In some
embodiments, the access request may further include: an
identifier of the subject device and an identifier of the object
device.

The identifier of the subject device or the identifier of the
object device may be a device type, a device model, a device
name, or the like. This is not limited in this embodiment of
this disclosure. From the perspective of a device function,
the device type herein may include, for example, a mobile
phone, a tablet computer, a smart headset, an IOT device, or
a smart home device.

The identifier of the invoker and the identifier of the
invokee may be an application identifier (APP ID).

In this embodiment of this disclosure, the first resource
may be a software resource or a hardware resource. The
hardware resource may include, for example, a camera, a
fingerprint sensor, an audio device, a display, a motor, a
flash, and the like that are provided by the device. The
software resource may include, for example, a memory
resource, a computing capability (for example, a beautifi-
cation algorithm capability and an audio/video encoding and
decoding capability), a network capability, a positioning
function, and the like that are provided by the device. The
first resource may include one or more resources. This is not
limited herein.

In some cases, the identifier of the invokee may be the
same as the identifier of the first resource. For example,
when the first resource is a camera, the identifier of the
invokee may also be an identifier of the camera, and is used
to indicate that the invokee is a camera application.

In some embodiments, the subject device may generate
the access request in response to a received user operation.

Figure 6C:
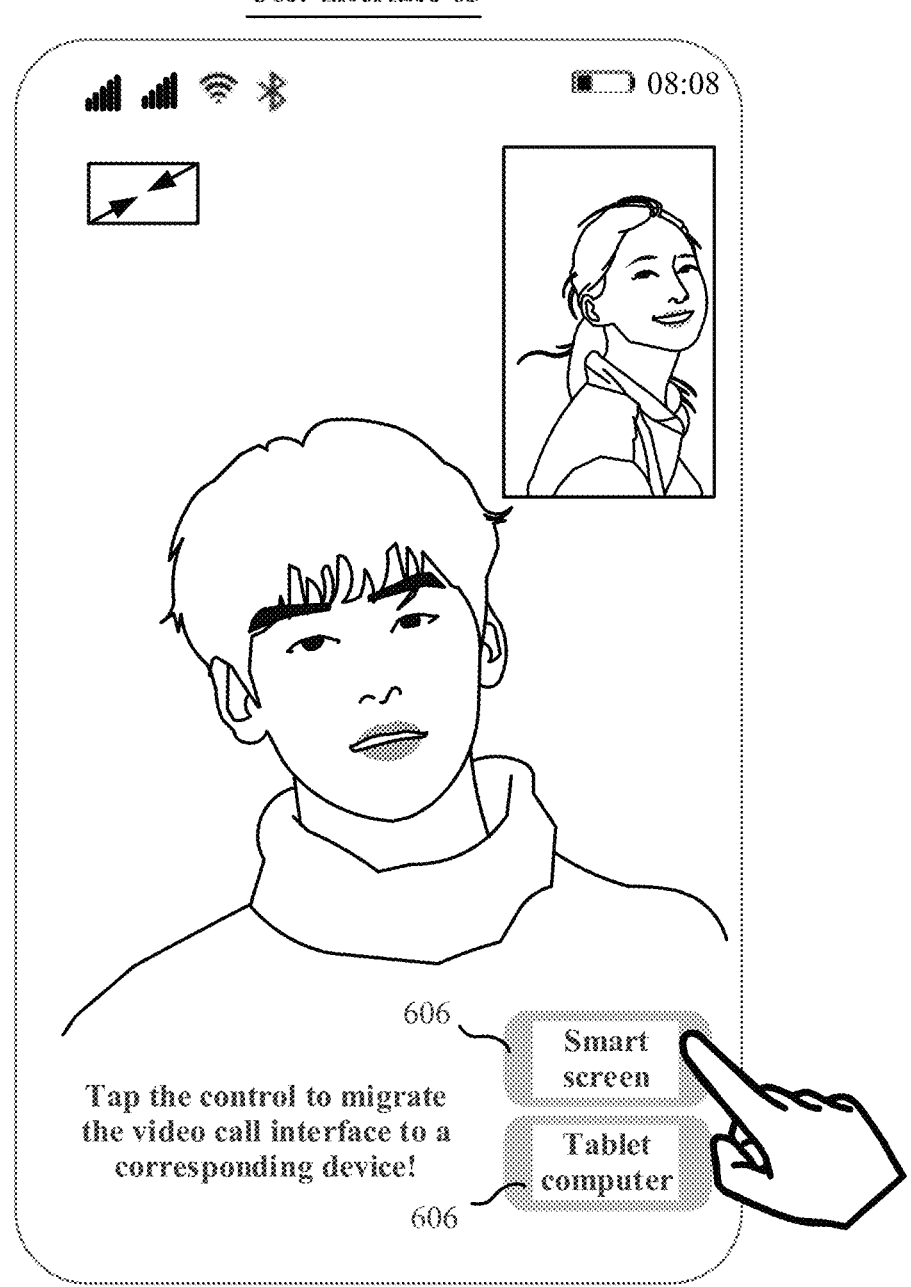

For example, FIG. 6C shows a user interface 63 displayed
when a subject device (for example, a mobile phone) runs an
instant messaging application. The user interface 63 is a
video call interface.

As shown in FIG. 6C, an image of a user at a subject
device end, an image of another user who is on a video call
with the user at the subject device end, and one or more
device options 606 are displayed in the user interface 63.
The one or more device options 606 may correspond to
devices such as a smart screen and a tablet computer that are
in the distributed system 10 and that can provide a camera
resource to meet a video call requirement of the subject
device.

As shown in FIG. 6C, the subject device may detect a user
operation performed on the device option 606, and generate
an access request in response to the user operation. The
access request is used by the instant messaging application
in the subject device to invoke a camera application and a
camera resource that are in a smart screen (in other words,
the object device) corresponding to the device option 606.

In some other embodiments, the subject device may also
autonomously initiate the access request to the object device
in some cases. For example, each time a video call is made,
the subject device may generate, by default, the access
request used by the instant messaging application in the
subject device to invoke the camera application and the
camera resource that are in the smart screen (in other words,
the object device).

In some embodiments, after generating the access request,
the subject device may first query whether the object device
opens, to the subject device, a permission required for the
access request, that is, query whether the content indicated
by the first capability information in S102 includes the
invokee and the first resource that are in the access request.
Then, the subject device queries whether the invoker has the
permission required for the access request, that is, queries
whether the invoker in S103 is granted the permission to
invoke the invokee in the access request and/or to access the
first resource. In addition, the subject device sends the
access request to the object device only when results of the
two queries are both yes. Certainly, the subject device may
alternatively execute only the first query, and send the access
request to the object device when the result of the first query
is yes.

The first query operation in the foregoing embodiment is
performed, to ensure that the subject device initiates the
access request within the capability opened by the object
device to the subject device, but does not initiate the access
request beyond the open capability range, so that a prob-
ability that the access request is responded can be increased,
and invalid communication between devices can be reduced.

The second query operation in the foregoing embodiment
is performed, to ensure that the subject device initiates the
access request within a range of permissions granted by the
subject device to applications, so that security of an entire
invoking process can be ensured.

In some other embodiments, the subject device may also
directly send the access request to the object device after
generating the access request.

In some embodiments, after receiving the access request,
the object device may directly perform subsequent S105 to
S110, and respond to the access request after obtaining a
permission required for the access request.

In some other embodiments, after receiving the access
request, the object device may perform subsequent S105 to
S110 on the premise that it is determined that the invokee
and/or the first resource are/is a sensitive resource, and
respond to the access request after obtaining the permission
required for the access request. For a definition of the
sensitive resource, refer to the foregoing related descrip-
tions. This can ensure that user authorization may be explicitly obtained when the sensitive resource in the object device is accessed, to ensure data security of the user.

S105: The object device determines one or more of the following: whether the object device meets an authorization condition, whether the object device is currently executing the first task, or whether the object device can currently obtain authorization from the user in time.

Whether the object device meets the authorization condition is related to software and hardware configuration of the object device, and the object device may determine, based on the software and hardware configuration of the object device, whether the object device meets the authorization condition. For detailed descriptions of the authorization condition, refer to the foregoing related descriptions. For example, an object device configured with a camera and a facial recognition algorithm supports face authorization, an object device configured with a fingerprint sensor supports fingerprint authorization, an object device configured with a sound pickup device supports voice instruction authorization, and an object device configured with a button supports button authorization.

For a definition of the first task, refer to the foregoing related descriptions. In specific implementation, the object device may first obtain a running status of the object device, and then determine, based on the running status, whether the object device is currently executing the first task. The running status of the object device may include: an application currently run on the object device, a running status of the application, and the like. The running status of the application may include foreground running, background running, full-screen running, and the like. For example, if the object device plays a video in full screen, and the object device supports only pop-up authorization, the object device is currently executing the first task. In this case, the pop-up authorization of the object device interrupts video play, and user experience is affected. For another example, if the object device is a smart headset, and the smart headset is playing a game sound effect, because the smart headset may simultaneously receive a voice instruction of the user, the smart headset is currently not executing the first task. In this case, the voice instruction authorization manner provided by the smart headset does not interrupt the game sound effect that is being played, and user experience is not affected.

That the object device cannot obtain authorization from the user in time may include the following two cases:

1. In a current scenario, the object device cannot directly provide an authorization manner for user authorization, and the user needs to perform more operations. For example, when the object device locks the screen, the electronic device can provide an authorization manner for user authorization only after the user performs an unlock operation on the object device.

2. When the user is not next to the object device, the object device cannot obtain authorization from the user within preset time. Specifically, when a distance between the user and the object device is greater than a first value, the object device cannot obtain the authorization from the user within the preset time. For example, when the object device is not carried by the user or is relatively far away from the user, the object device cannot obtain the authorization from the user within the preset time after providing an authorization manner. For example, the user is in a bedroom, and the object device is in a living room.

Therefore, the object device may obtain a screen status of the object device, and determine, based on the screen status, whether the object device is in the first case in which the object device cannot obtain the authorization from the user in time. The screen status may include: a screen-locked state and an unlocked state. When the electronic device is in the screen-locked state, the user needs to enter verification information to unlock the electronic device and enter the unlocked state. The electronic device can provide more functions when the electronic device is in the unlocked state than when the electronic device is in the screen-locked state.

In addition, the object device may further obtain a distance between the object device and the user, and determine, based on the distance, whether the object device is in the first case in which the object device cannot obtain the authorization from the user in time. A manner in which the object device obtains a distance between the object device and the user is not limited in this embodiment of this disclosure. For example, a status may be shared between devices in the distributed system 10. If a device is currently being controlled by the user (for example, the device receives a user operation within 10 s), the device may send a signal, and the object device may receive the signal, then may measure a distance between the object device and the device based on received signal strength indication (received signal strength indication, RSSI), that is, a distance between the object device and the user. For another example, in a home distributed system, devices may be disposed by the user at a fixed location. For example, a smart desk lamp may be disposed in a bedroom, a smart speaker and a smart screen may be disposed in a living room, and a distance between devices may be pre-stored in the devices. If a device is currently being controlled by the user (for example, the device receives a user operation within 10 s), the device may share the status with other devices in the system, and the object device may learn, based on the sharing status and the pre-stored distance, a distance between the object device and the user.

S106: If determining results of the one or more of the following in S105 are no, the object device selects one electronic device as an authorization device from electronic devices other than the object device in the distributed system 10.

In S105, if the object device does not meet the authorization condition, the object device cannot request the user to grant the permission required for the access request. If the object device is currently executing the first task, the object device requests the user to grant the permission required for the access request, which disturbs the user and affects user experience. If the object device cannot currently obtain the authorization from the user in time, efficiency of responding to the access request by the object device is affected, and user experience is also affected.

Therefore, if determining results of one or more of the following in S105 are no, the object device may select another electronic device in the distributed system 10 as an authorization device.

In this embodiment of this disclosure, a policy used when the object device selects one electronic device as an authorization device from electronic devices other than the object device in the distributed system 10 may include one or more of the following:

1. If the object device is a thin device, the object device selects a control device of the thin device as an authorization device, selects a rich device in the distributed system as an authorization device, or selects an electronic device that keeps a communication connection to the first device for more than a preset duration as an authorization device.

2. In electronic devices other than the object device in the distributed system 10, the object device selects an authorization device based on one or more of the following of the electronic devices: whether the electronic devices meet an authorization condition, authorization manners supported by the electronic devices, screen statuses of the electronic devices, running statuses of the electronic devices, distances between the electronic devices and a user, and the like.

For example, the object device may select an electronic device that meets the authorization condition as the authorization device.

For another example, the object device may select an electronic device that supports a relatively large quantity of authorization manners as the authorization device.

For another example, the object device may select an electronic device whose screen status is an unlocked state as the authorization device. This can ensure that the user can conveniently and quickly grant, on the authorization device, the permission required for the access request, so that efficiency of responding to the access request by the object device is improved, to improve user experience.

For another example, the object device may select an electronic device that is currently not executing the first task as the authorization device. In this way, when the object device obtains the permission required for the access request, the user cannot be disturbed, and user experience is not affected.

For another example, the object device may select an electronic device closest to or relatively close to the user as the authorization device. Specifically, the object device may select an electronic device whose distance from the user is less than a second value as the authorization device. In this way, the object device can obtain the permission required by the access request as soon as possible, so that efficiency of responding to the access request by the object device is improved, to improve user experience.

For a policy used when the electronic device selects one electronic device from electronic devices in the distributed system as an authorization device, refer to related descriptions in the following method embodiments. Details are not described herein.

In the second policy, whether the electronic devices meet the authorization condition and the authorization manners supported by the electronic devices may be obtained from the other electronic devices after the object device establishes connections to other electronic devices in the distributed system 10.

The screen statuses of the electronic devices, the running statuses of the electronic devices, and the distances between the electronic devices and the user may be obtained synchronously or periodically after the object device establishes connections to the other electronic devices, or may be obtained by actively querying the other electronic devices by the object device when the determining results of the one or more of the following in S105 are no. For an implementation in which the electronic devices in the distributed system obtain distances between the electronic devices and the user, refer to the manner in which the object device obtains a distance between the electronic device and the user in S105. Details are not described herein again.

The foregoing policies used when the object device selects an authorization device are merely examples. In specific implementation, there may be more policies for selecting an authorization device. This is not limited in this embodiment of this disclosure.

A policy used when the object device selects an authorization device may be set by the object device by default, or may be set by the user. This is not limited herein.

In this embodiment of this disclosure, an authorization device selected by the object device may be a same device as the subject device. This is not limited herein.

In some embodiments, after selecting the authorization device, the object device may further select an authorization manner subsequently used by the authorization device. A policy used when the object device selects an authorization manner of the authorization device is not limited in this embodiment of this disclosure. For example, the object device may select any one of authorization manners supported by the authorization device as an authorization manner for subsequent use. For another example, the object device may prioritize various authorization manners in advance, for example, priorities of pop-up authorization, facial verification authorization, fingerprint verification authorization, voice instruction authorization, and button authorization decrease in descending order, and the object device selects an authorization manner with highest priority as an authorization manner subsequently used by the authorization device.

In some embodiments, the object device may alternatively first select an authorization manner, and then select an authorization device. This is not limited herein.

S107: The object device sends an authorization request to the authorization device, where the authorization request is used to request the authorization device to apply to the user for a permission to invoke the invokee in the object device, and/or apply to the user for a permission to access the first resource in the object device.

The authorization request carries an identifier of the object device, and further carries either of an identifier of the invokee and an identifier of the first resource. In this way, the authorization request is used to apply to the user for the permission to invoke the invokee in the object device, and/or apply to the user for the permission to access the first resource in the object device.

In some embodiments, the authorization request may further carry one or more of the following: an identifier of the subject device and an identifier of the invoker. When the authorization request carries the identifier of the subject device, the authorization request may further apply to the user for a permission for the subject device to invoke the invokee in the object device and/or to access the first resource. When the authorization request carries the identifier of the invoker, the authorization request may further apply to the user for a permission for the invoker to invoke the invokee in the object device and/or to access the first resource.

When the authorization device carries the identifier of the subject device and/or the identifier of the invoker, the user may learn more detailed information about the permission required for the access request currently received by the object device, to determine whether to grant the permission to the object device. This can ensure that the user fully understands the permission required for the access request, and then performs an authorization operation, to avoid a misoperation or false authorization of the user, and ensure data security in the object device.

S108: The authorization device requests the user to grant the permission requested by the authorization request.

The authorization device may request, in an authorization manner supported by the authorization device, the user to grant the permission requested by the authorization request. The following describes different authorization manners.

When the authorization device supports pop-up authorization, the authorization device may output prompt information on a display, where the prompt information is used to prompt the permission requested by the authorization request. Then, the authorization device may detect a user operation performed on the display, and obtain, in response to the user operation, the permission requested by the authorization request.

Figure 7A:
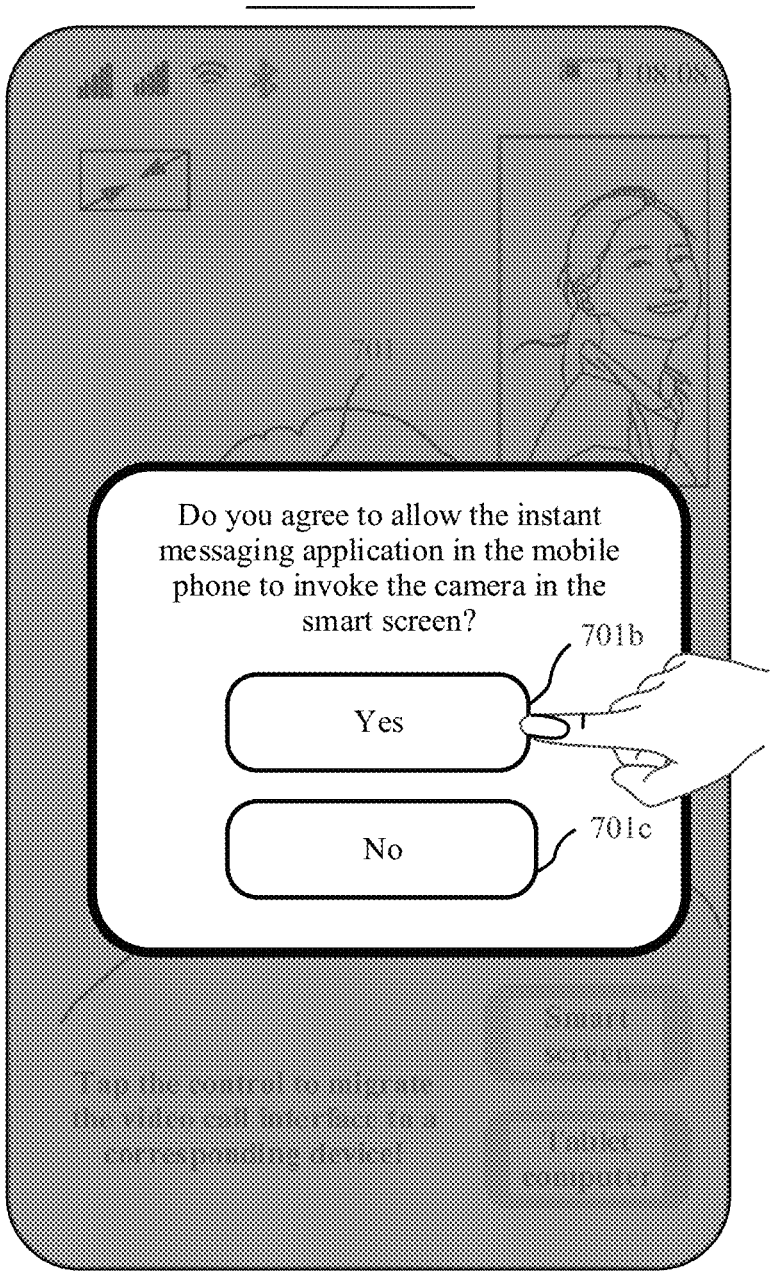
FIG. 7A to FIG. 7D show a scenario in which an authorization device requests authorization according to an embodiment of this disclosure.

FIG. 7A shows an example of a user interface 71 displayed when the mobile phone requests user authorization in the pop-up authorization manner when the authorization device is a subject device, that is, the mobile phone shown in FIG. 5A and FIG. 5B, and FIG. 6A and FIG. 6B.

A window 701, prompt information 701*a*, a control 701*b*, and a control 701*c* are displayed in the user interface 71. The prompt information 701*a* is used to prompt the user to grant a permission for the invoker in the subject device to invoke the invokee in the object device to access the first resource. The prompt information 701*a* may be, for example, a text "Do you agree to allow the instant messaging application in the mobile phone to invoke the camera in the smart screen?" In the text, the "mobile phone" indicates the subject device, the "instant messaging application" indicates the invoker, the "smart screen" indicates an object application, the "camera" indicates that the invokee is a camera application, and the first resource is a camera resource. The control 701*b* may be configured to listen to a user operation. The authorization device successfully obtains, in response to the user operation, the permission for the instant messaging application in the mobile phone to invoke the camera in the smart screen. The control 701*c* may be configured to listen to a user operation. The authorization device learns, in response to the user operation, that the authorization device currently fails to obtain the permission for the instant messaging application in the mobile phone to invoke the camera in the smart screen.

Figure 7B:
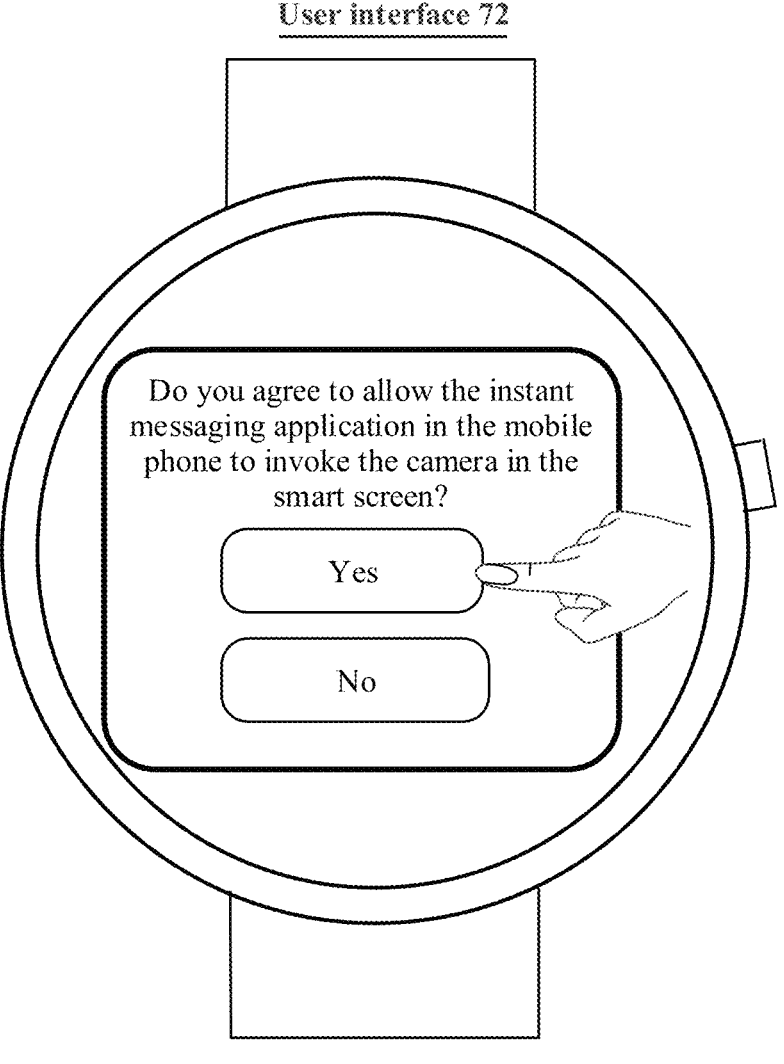

FIG. 7B shows an example of a user interface 72 displayed when the smart watch requests user authorization in the pop-up authorization manner when the authorization device is a smart watch. For the user interface 72, refer to the user interface 71 shown in FIG. 7A. Details are not described herein again.

The user interface 71 shown in FIG. 7A or the user interface 72 shown in FIG. 7B may be referred to as a first user interface. The control 701*b* in the user interface 71 may be referred to as a first control.

When the authorization device supports fingerprint verification authorization, the authorization device may collect a fingerprint of the user by using a fingerprint sensor, and compare the collected fingerprint with a preset fingerprint. If the collected fingerprint is consistent with the preset fingerprint, the authorization device obtains the permission requested by the authorization request.

When the authorization device supports facial verification authorization, the authorization device may collect a face image of the user by using a camera, and compare the collected face image with a preset face image. If the collected face image is consistent with the preset face image, the authorization device obtains the permission requested by the authorization request.

When the authorization device supports voice instruction authorization, the authorization device may collect, by using a microphone, a receiver, or another sound pickup device, a voice instruction entered by the user, and compare the collected voice instruction with a preset voice instruction. If the collected voice instruction is consistent with the preset voice instruction, the authorization device obtains the permission requested by the authorization request.

Figure 7C:
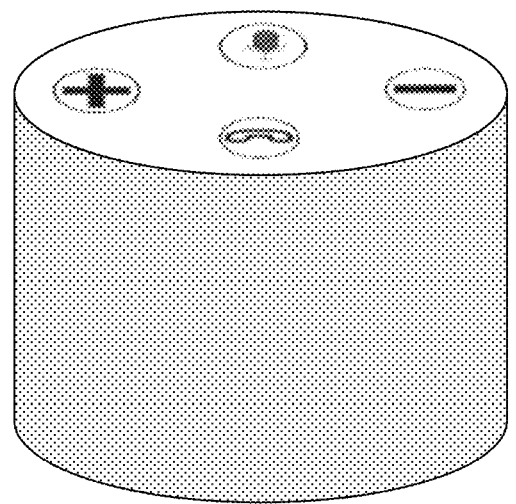

FIG. 7C shows an example of a scenario in which the authorization device requests user authorization in the voice instruction authorization manner when the authorization device is a smart speaker.

As shown in FIG. 7C, the smart speaker may first play a prompt voice, to prompt the user to enter a specific voice instruction to grant the foregoing permission. For example, the prompt voice may be "The instant messaging application in the mobile phone requests to invoke the camera in the smart screen. Do you agree to invoke the camera?". Then, if the smart speaker collects a voice instruction "yes" entered by the user, the smart speaker has obtained the permission for the instant messaging application in the mobile phone to invoke the camera in the smart screen.

When the authorization device supports button authorization, the authorization device may collect a press operation of the user by using a physical button. If the authorization device collects a preset press operation (for example, one press operation, a press and hold operation, or two consecutive press operations) on the physical button, the authorization device obtains the permission requested by the authorization request.

Figure 7D:
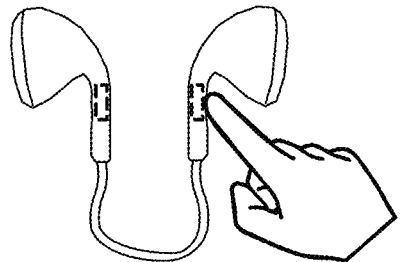

FIG. 7D shows an example of a scenario in which the authorization device requests user authorization in the button authorization manner when the authorization device is a smart headset.

As shown in FIG. 7D, the smart headset may first play a prompt voice, to prompt the user to enter a specific voice instruction to grant the foregoing permission. For example, the prompt voice may be "The instant messaging application in the mobile phone requests to invoke the camera in the smart screen. Do you agree to invoke the camera?". Then, if a physical button of the smart headset receives a press operation entered by the user, the smart headset has obtained the permission for the instant messaging application in the mobile phone to invoke the camera in the smart screen.

In some embodiments, the authorization device may request to obtain the foregoing permission in any authorization manner supported by the authorization device.

In some other embodiments, if the object device selects an authorization manner used by the authorization device in S106, the authorization device may request to obtain the foregoing permission in the authorization manner.

In S108, a result of applying to the user for the permission by the authorization device may be referred to as an authorization result. If the authorization device obtains the permission requested by the authorization request, the authorization result is that the authorization succeeds. If the authorization device fails to obtain the permission requested by the authorization request, the authorization result is that the authorization fails.

S109: The authorization device sends the authorization result to the object device.

In some other embodiments, the authorization device may directly send obtained permission information to the object device.

S110: The object device determines, based on the authorization result, whether to respond to the access request.

If the authorization result is that the authorization fails, the object device refuses to respond to the access request sent by the subject device.

If the authorization result is that the authorization succeeds, in some embodiments, the object device may directly respond to the access request. In some other embodiments, the object device may further query whether the permission to access the invokee and/or to access the first resource is opened to the subject device, and if yes, the object device responds to the access request.

In some embodiments, that the object device responds to the access request may specifically include one or more of the following:

1. The object device invokes the first resource to perform a series of operations, for example, displaying a video call interface by using a display, collecting an image by using a camera, performing a computing operation, and obtaining location information.

2. The object device sends an access result of accessing the first resource to the subject device. For example, the object device sends an image collected by a camera to the subject device, and then the subject device sends the image to another device that is in a video call with another device end. For another example, the object device sends a computing result and obtained location information to the subject device.

3. The object device receives data sent by the subject device, and accesses the first resource by using the data. For example, the object device may receive the image that is sent by the subject device and that is collected by another device that is in a video call with the another device end, and display the image in a video call interface of a display.

Figure 8:
FIG. 8 shows a user interface implemented on an object device according to an embodiment of this disclosure.

FIG. 8 shows an example of a user interface 81 displayed when the object device responds to the access request according to this disclosure. The user interface 81 is a video call interface, and an image that is of a user and that is collected by the object device and an image of another user who is on a video call with the user at a subject device end are displayed in the user interface 81. The image of the another user who is on the video call with the user at the subject device end may be sent by the subject device to the object device. Prompt information 801 may be further displayed in the user interface 81, and is used to prompt that the object device is currently responding to the access request. Because a size of a display of the subject device is different from a size of a display of the object device, a layout of elements of the video call interface in FIG. 8 may change compared with the video call interface 61 displayed in the subject device.

This is not limited to the scenario shown in FIG. 8. In specific implementation, the object device may respond to the access request in another type, which depends on specific content of the access request. This is not limited in this embodiment of this disclosure.

According to the access control method shown in FIG. 4, when receiving the access request sent by the subject device, the object device can flexibly select an authorization device in a case in which the user is not disturbed and user experience is ensured, and quickly and conveniently obtain the permission required for the access request. This ensures that electronic devices in the distributed system can access a resource in another electronic device across devices, so that the electronic devices can share resources with each other, to meet an actual requirement of the user.

This is not limited to the distributed system listed in the foregoing example, and the method shown in FIG. 4 may alternatively be applied to a single electronic device. For example, an invoker and an invokee are installed in the electronic device, and the electronic device is both a subject device and an object device. The electronic device may generate an access request, where the access request is used by the invoker in the object device to invoke the invokee to access a first resource in the electronic device. For time and a manner of generating the access request, refer to related descriptions of generating the access request by the object device in S104 in FIG. 4. After generating the access request, the electronic device may perform S105 to S110 in the method shown in FIG. 4. For details in which the single electronic device performs the access control method provided in this embodiment of this disclosure, refer to related descriptions in FIG. 4. Details are not described herein again.

The single electronic device performs the access control method provided in this embodiment of this disclosure, so that the single electronic device can flexibly select an authorization device in a case in which the user is not disturbed and user experience is ensured, and quickly and conveniently obtain the permission required for the access request generated by the electronic device, and then the electronic device accesses a resource of the electronic device. For example, the single electronic device may be a mobile phone. When the mobile phone runs a game application in full screen, if a map application running in the background wants to access a positioning capability of the mobile phone, the mobile phone may select an authorization device in the distributed system, and obtain, by using the authorization device, a permission for the map application to access the positioning capability, and then run the map application to access the positioning capability. In this way, an access positioning capability of the map application in the mobile phone can be ensured when the user is not disturbed.

In the foregoing embodiment of this disclosure:

The object device may be referred to as a first device, the authorization device may be referred to as a second device, and the subject device may be referred to as a third device.

In S107, the permission requested by the authorization request sent by the object device to the authorization device may be referred to as a first permission. For specific content of the first permission, refer to related descriptions in S107 in FIG. 4.

In S108, the operation that is received by the authorization device and that is used to grant the first permission may be referred to as a first operation. The first operation may include, for example, a user operation performed on the control 701*b* in the user interface 71 that is shown in FIG. 7A and that is displayed in the display, a preset face image collected by a camera, a preset fingerprint collected by a fingerprint sensor, a preset voice instruction collected by a sound pickup device, or a user operation performed on a button. For specific implementation of the first operation, refer to related descriptions in S108 in FIG. 4.

In S102, the capability opened by the object device to the subject device may be referred to as a second permission. For specific content of the second permission, refer to related descriptions in S102.

In S108, when the authorization device requests the user to grant the permission requested by the authorization request, software and/or hardware required in the used authorization manner may be referred to as a second module.

The implementations of this disclosure may be randomly combined, to achieve different technical effects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present disclosure, but are not intended to limit the protection scope of the present disclosure. Any modification, equivalent replacement, or improvement made according to the disclosure of the present disclosure shall fall within the protection scope of the present disclosure.

What is claimed is:

1. A flexible authorization access control method, applied to a first device, the method comprising:
   obtaining, by the first device from a third device in a plurality of electronic devices, an access request that is used by an invoker in the third device to invoke an invokee in the first device to access a first resource in the first device, wherein the access request includes an identifier of the invoker in the third device, an identifier of the invokee and an identifier of the first resource, the first resource comprises a hardware resource that includes at least one of a camera, a fingerprint sensor, an audio device, a display, a motor, or a flash, and wherein the invoker is a first application (APP), the invokee is a second APP or a functional component, each of the first APP and the second APP is a program entity that implements a plurality of functions, and the functional component is a program entity that implements a single function;
   determining, by the first device, a second device in the plurality of electronic devices in one or more of the following cases: the first device is not configured with a first module configured to receive a first operation, the first device is configured with the first module and executes a first task by using the first module, the first device is in a screen-locked state, or a distance between the first device and a user is greater than a first value;
   sending, by the first device, an authorization request to the second device, wherein the authorization request is used to request the user to grant a first permission that comprises at least one of a permission to invoke the invokee in the first device, or a permission to access the first resource in the first device;
   receiving, by the first device, an authorization result sent by the second device, wherein the authorization result indicates that the user has granted the first permission; and
   invoking, by the first device, the invokee in response to the authorization result to access the first resource.

2. The method according to claim 1, wherein the first permission comprises at least one of:
   a permission for the third device to invoke the invokee in the first device, or
   a permission for the third device to access the first resource in the first device.

3. The method according to claim 1, wherein before receiving, by the first device, the access request sent by the third device, the method further comprises:
   sending, by the first device, first capability information to the third device, wherein the first capability information indicates that the first device opens a second permission to the third device, and the second permission comprises at least one of a permission to invoke the invokee in the first device or to access the first resource.

4. The method according to claim 1, wherein the first device and the second device log in to a same account.

5. The method according to claim 1, wherein the second device is a control device of the first device, the second device is a rich device, or the second device is an electronic device that keeps a communication connection to the first device for more than a preset duration.

6. The method according to claim 1, wherein the determining, by the first device, the second device in the plurality of electronic devices comprises:
   determining, by the first device, the second device based on one or more of the following of the plurality of electronic devices: whether the first module is configured, a quantity of the configured first modules, a screen status, a running status, or distances between the plurality of electronic devices and the user.

7. The method according to claim 6, wherein
   the second device is configured with the first module; and/or
   the second device meets one or more of the following: the screen status is an unlocked state, the running status indicates that the first task is not executed, or a distance between the second device and the user is less than a second value.

8. The method according to claim 1, wherein
   the first operation comprises one or more of the following: a user operation performed on a display, a preset face image, a preset fingerprint, a preset voice instruction, or a user operation performed on a button.

9. The method according to claim 1, wherein the access request includes an identifier of the third device, and an identifier of the first device.

10. The method according to claim 1, wherein the first APP is an instant messaging application or an online classroom application.

11. An electronic device, comprising:
   one or more processors; and
   a memory coupled to the one or more processors and configured to store computer program code, wherein the computer program code comprises computer instructions that, when executed by the one or more processors, cause the electronic device to perform the following operations:

obtaining an access request that is sent by a third device in a plurality of electronic devices and is used by an invoker in the third device to invoke an invokee in the electronic device to access a first resource in the electronic device; wherein the access request includes an identifier of the invoker in the third device, an identifier of the invokee and an identifier of the first resource, the first resource is a hardware resource that includes at least one of a camera, a fingerprint sensor, an audio device, a display, a motor, or a flash, and wherein the invoker is a first application (APP), the invokee is a second APP or a functional component, each of the first APP and second APP is a program entity that implements a plurality of functions, and the functional component is a program entity that implements a single function;

determining a second device in the plurality of electronic devices in one or more of the following cases: the electronic device is not configured with a first module configured to receive a first operation, the electronic device is configured with the first module and executes a first task by using the first module, the electronic device is in a screen-locked state, or a distance between the electronic device and a user is greater than a first value;

sending an authorization request to the second device, wherein the authorization request is used to request the user to grant a first permission, and the first permission comprises at least one of a permission to invoke the invokee in the electronic device, or a permission to access the first resource in the electronic device;

receiving an authorization result sent by the second device, wherein the authorization result indicates that the user has granted the first permission; and invoking the invokee in response to the authorization result to access the first resource.

12. The electronic device according to claim 11, wherein the first permission comprises at least one of:

a permission for the third device to invoke the invokee in the electronic device, or a permission for the third device to access the first resource in the electronic device.

13. The electronic device according to claim 11, wherein the access request includes an identifier of the third device, and an identifier of the first device.

14. The electronic device according to claim 11, wherein the first APP is an instant messaging application or an online classroom application.

15. A non-transitory computer-readable storage medium, comprising instructions that, when run on an electronic device, cause by the electronic device is enabled to perform:

obtaining an access request that is sent by a third device in a plurality of electronic devices and is used by an invoker in the third device to invoke the invokee in the first device to access a first resource in the first device, wherein the access request includes an identifier of the invoker in the third device, an identifier of the invokee and an identifier of the first resource, the first resource is a hardware resource that includes at least one of a camera, a fingerprint sensor, an audio device, a display, a motor, or a flash, and wherein the invoker is a first application (APP), the invokee is a second APP or a functional component, each of the first APP and second APP is a program entity that implements a plurality of functions, and the functional component is a program entity that implements a single function;

determining a second device in the plurality of electronic devices in one or more of the following cases: the first device is not configured with a first module configured to receive a first operation, the first device is configured with the first module and executes a first task by using the first module, the first device is in a screen-locked state, or a distance between the first device and a user is greater than a first value;

sending an authorization request to the second device, wherein the authorization request is used to request the user to grant a first permission, and the first permission comprises at least one of a permission to invoke the invokee in the first device, or a permission to access the first resource in the first device;

receiving an authorization result sent by the second device, wherein the authorization result indicates that the user has granted the first permission; and invoking the invokee in response to the authorization result to access the first resource.

16. The non-transitory computer-readable storage medium according to claim 15, wherein the access request includes an identifier of the third device, and an identifier of the first device.

17. The non-transitory computer-readable storage medium according to claim 15, wherein the first APP is an instant messaging application or an online classroom application.

* * * * *